US012747398B2

(12) United States Patent
Akah et al.

(10) Patent No.: US 12,747,398 B2
(45) Date of Patent: *Sep. 29, 2026

(54) PROCESSES FOR DIRECT CONVERSION OF CRUDE OIL TO LIGHT OLEFINS AND LIGHT AROMATICS THROUGH STEAM ENHANCED CATALYTIC CRACKING OVER A CORE SHELL CRACKING CATALYST

(71) Applicants: Saudi Arabian Oil Company, Dhahran (SA); King Fahd University of Petroleum and Minerals, Dhahran (SA)

(72) Inventors: Aaron Chi Akah, Dhahran (SA); Ziyauddin Qureshi, Dhahran (SA); Abdullah Mohammed Aitani, Khobar (SA); Mohammed Abdul Bari Siddiqui, Dhahran (SA); Musaed Salem Al-Ghrami, Dammam (SA); Mansour Ali Al-Herz, Al-Ahsa (SA); Qi Xu, Dhahran (SA); Abdulkadir Tanimu, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 562 days.

This patent is subject to a terminal disclaimer.

(21) Appl. No.: 18/308,123

(22) Filed: Apr. 27, 2023

(65) Prior Publication Data

US 2024/0360370 A1 Oct. 31, 2024

(51) Int. Cl.
*C10G 11/20* (2006.01)
*B01J 29/08* (2006.01)
(Continued)

(52) U.S. Cl.
CPC ............ *C10G 11/20* (2013.01); *B01J 29/084* (2013.01); *B01J 29/40* (2013.01); *B01J 29/7007* (2013.01);
(Continued)

(58) Field of Classification Search
CPC ........ C10G 11/20; C10G 11/05; B01J 29/084; B01J 29/40; B01J 29/7007; B01J 35/19;
(Continued)

(56) References Cited

U.S. PATENT DOCUMENTS 5,082,814 A * 1/1992 Stockwell ............ B01J 37/0215 502/68
2008/0314798 A1* 12/2008 Stockwell ............ B01J 37/0246 502/73
(Continued)

FOREIGN PATENT DOCUMENTS

CN 114425417 A 5/2022
WO WO-2018011652 A1 * 1/2018 .............. B01J 29/80

OTHER PUBLICATIONS

Akah et al., "An Overview of Light Olefins Production via Steam Enhanced Catalytic Cracking", Catalysis Surveys from Asia, vol. 23, No. 4, 2019.
(Continued)

*Primary Examiner* — Michelle Stein
(74) *Attorney, Agent, or Firm* — Dinsmore & Shohl LLP

(57) ABSTRACT

A process for converting a hydrocarbon feed includes contacting a hydrocarbon feed with steam in the presence of a cracking catalyst under steam enhanced catalytic cracking conditions. The contacting the hydrocarbon feed with the steam in the presence of the cracking catalyst causes at least a portion of the hydrocarbon feed to undergo steam catalytic cracking reactions to produce a cracked effluent comprising $C_2$ to $C_4$ olefins, $C_6$ to $C_{10}$ aromatic compounds, or both. The
(Continued)

cracking catalyst is a nanoparticle. The nanoparticle has a core and a shell. The core includes at least one zeolite particle, where the at least one zeolite particle includes ZSM-5 zeolites, Beta zeolites, Y-zeolites, or combinations of these zeolites. The shell is mesoporous and incudes silica ($SiO_2$), alumina ($Al_2O_3$), or silica and alumina.

19 Claims, 10 Drawing Sheets

(51) Int. Cl.
*B01J 29/40* (2006.01)
*B01J 29/70* (2006.01)
*B01J 35/00* (2006.01)
*B01J 35/40* (2024.01)
*B01J 35/61* (2024.01)
*B01J 35/63* (2024.01)
*B01J 35/64* (2024.01)
*B01J 35/69* (2024.01)

(52) U.S. Cl.
CPC ............... *B01J 35/19* (2024.01); *B01J 35/40* (2024.01); *B01J 35/615* (2024.01); *B01J 35/617* (2024.01); *B01J 35/618* (2024.01); *B01J 35/633* (2024.01); *B01J 35/647* (2024.01); *B01J 35/651* (2024.01); *B01J 35/69* (2024.01)

(58) Field of Classification Search
CPC ........ B01J 35/40; B01J 35/615; B01J 35/617; B01J 35/618; B01J 35/633; B01J 35/647; B01J 35/651; B01J 35/69; B01J 2235/15; B01J 2235/30; B01J 35/53; B01J 37/0018
See application file for complete search history.

(56) References Cited

U.S. PATENT DOCUMENTS

2012/0122662 A1 5/2012 Khanmamedova et al.
2018/0193826 A1* 7/2018 Al-Khattaf ........... B01J 37/0221
2019/0039968 A1* 2/2019 Soultanidis .............. B01J 29/44
2022/0098493 A1* 3/2022 Akah ........................ B01J 38/16
2022/0152577 A1* 5/2022 Kang ................... B01J 20/0207
2022/0355277 A1 11/2022 Basset et al.
2023/0347330 A1* 11/2023 Han ....................... B01J 35/617
2025/0018381 A1* 1/2025 Pengpanich ........... B01J 35/633

OTHER PUBLICATIONS

Barghi et al., "Modeling of ZnZSM-5 deactivation during liquefied petroleum gas catalytic crackign in the presence of steam", Reac Kinet Mech Cat, DOI 10.1007/s11144-016-1126-2, Jan. 5, 2017, 22 pages.
Chenxi et al., "Effect of Ce-modified Fe/ZSM-5 zeolite for selective catalytic reduction of NOx by ammonia", E3S Web of Conferences, vol. 218, No. 03032, 2020.
Corma et al., "Steam catalytic cracking of naphtha over ZSM-5 zeolite for production of propene and ethene: Micro and macroscopic implications of the presence of steam", Applied Catalysis A: General, vol. 417-418, pp. 220-235, 2012.
Corma et al., "IM-5 zeolite for steam catalytic cracking of naphtha to produce propene and ethene. An alternative to ZSM-5 zeolite", Applied Catalysis A: General, vol. 460-461, pp. 106-115, 2013.
Dharia et al., "Catalytic Cracking for Integration of Refinery and Steam Crackers", Advances in Fluid Catalytic Cracking, Characterization & Environmntal Regulations, Occelli, M, Ed. CRC Press, New York, pp. 119-126, 2010.
Firmansyah et al., "Synthesis and characterization of fibrous silica ZSM-5 for cumene hydrocracking", Catalysis Science & Technology, vol. 6, pp. 5178-5182, 2016.
Fumoto et al., "Catalytic Cracking of Heavy Oil with Iron Oxide-based Catalysts Using Hydrogen and Oxygen Species from Steam", Journal of the Japan Petroleum Institute, vol. 58, No. 5, pp. 329-335, 2015.
Fumoto et al., "Iron Oxide Based Catalyst for Catalytic Cracking of Heavy Oil", Iron Ores and Iron Oxide Materials, Ed. V. Shatokha, IntechOpen, London, pp. 93-110, 2018.
Genquan et al., "Research and Commercial Application of CPP Technology for Producing Light Olefins from Heavy Oil", China Petroleum Processing and Petrochemical Technology, vol. 15, No. 3, pp. 7-12, Sep. 30, 2013.
Ghashghaee et al., "Steam catalytic cracking of fuel oil over a novel composite nanocatalyst: Characterizatoin, kinetics and comparative perspecive", Journal of Analytical and Applied Pyrolysis, vol. 138, pp. 281-293, 2019.
Gugel, "Executive Viewpoint: Introducing the refinery of the future":, Hydrocarbon Processing, March, issue No. 3, pp. 12-17, 2019.
Hambali et al., "Unique structure of fibrous ZSM-5 catalyst expedited prolonged hydrogen atom restoration for selective production of propylene from methanol", International Journal of Hydrogen Energy, vol. 46, pp. 24652-24665, 2021.
Lee, "The Growth Area That Refiners Will Need", Petrochemicals, Presented at the Asian Petrochemical Industry Conference (APIC), Taipei, May 2019.
Meng et al., "Studies on catalytic pyrolysis of heavy oils: Reaction behaviors and mechanistic pathways", Applied Catalysis A: General, vol. 294, pp. 168-176, 2005.
Mohiuddin et al., "Catalytic cracking of naphtha: The effect of Fe and Cr impregnated ZSM-5 on olefin selectivity", Applied Petrochemical Research, vol. 8, pp. 119-129, 2018.
Mukherjee, "KBR Olefins Technology—Technology options to meet uncertain market conditions", Presented at the 4th Petrochemicals Conclave, Delhi, Feb. 12, 2015.
Tallman, "Consider new catalytic routes for olefins production", Eng, Hydrocarbon Proc. 87 (4) pp. 95-101, 2008.
Yao, et al., "Preparation of Ce—Mn/Fe2O3 Catalysts for Steam Catalytic Cracking of Coal Tar", Energy Technology & Environmental Science, Chemistry Select, vol. 3, pp. 12537-12543, 2018.
Qureshi et al., "Steam catalytic cracking of crude oil over novel hierarchical zeolite-containing mesoporous silica-alumina core-shell catalysts", https://ssrn.com/abstract=4129096, Jun. 6, 2022.
Notification of Transmittal of the International Search Report and the Written Opinion of the International Searching Authority, or the Declaration dated Jul. 4, 2024 pertaining to International application No. PCT/US2024/025337 filed Apr. 19, 2024, pp. 1-14.
Qureshi, Ziyauddin S. et al: "Steam catalytic cracking of crude oil over novel hierarchical zeolite-containing mesoporous silica-alumina core-shell catalysts", Journal of Analytical and Applied Pyrolysis, vol. 166, Sep. 1, 2022, 105621, pp. 1-11.
Pan, Meng et al: "Construction and practical application of a novel zeolite catalyst for hierarchically cracking of heavy oil", Journal of Catalysis, vol. 369, Nov. 14, 2018, pp. 72-85.
Qian, Xufang F. et al: "Exploring Meso-/Microporous Composite Molecular Sieves with Core-Shell Structures", Chemistry—A European Journal, John Wiley & Sons, Inc, DE, vol. 18, No. 3, Dec. 14, 2011, pp. 931-939.
Jia, Lixia et al: "Core-shell composites of USY@Mesosilica: Synthesis and application in cracking heavy molecules with high liquid yield", Microporous and Mesoporous Materials, Elsevier, Amsterdam ,NL, vol. 176, Mar. 29, 2013, pp. 16-24.

* cited by examiner

PROCESSES FOR DIRECT CONVERSION OF CRUDE OIL TO LIGHT OLEFINS AND LIGHT AROMATICS THROUGH STEAM ENHANCED CATALYTIC CRACKING OVER A CORE SHELL CRACKING CATALYST

BACKGROUND

Field

The present disclosure relates to processes and catalysts for processing hydrocarbon materials and, in particular, processes and cracking catalysts for direct conversion of crude oil through steam enhanced catalytic cracking to produce olefins, aromatic compounds, or both.

Technical Background

The worldwide increasing demand for greater value petrochemical products and chemical intermediates remains a major challenge for many integrated refineries. In particular, the production of some valuable light olefins, such as ethylene and propylene, has attracted increased attention as pure olefin streams are considered the building blocks for polymer synthesis. Additionally, light aromatic compounds, such as benzene, toluene, and mixed xylenes can be useful as fuel blending constituents or can be converted to greater value chemical products and intermediates, which can be used as building blocks in chemical synthesis processes. Petrochemical feeds, such as crude oils, can be converted to petrochemicals, such as fuel blending components and chemical products and intermediates, such as light olefins and aromatic compounds, which are basic intermediates for a large portion of the petrochemical industry. Crude oil is conventionally processed by distillation followed by various reforming, solvent treatments, and hydro-conversion processes to produce a desired slate of fuels, lubricating oil products, chemicals, chemical feedstocks, and the like. Conventional refinery systems generally combine multiple complex refinery units with petrochemical plants to produce greater value petrochemical products and intermediates.

SUMMARY

Accordingly, there is an ongoing need for cracking catalysts and processes for steam enhanced catalytic cracking of crude oil feeds and other hydrocarbon feeds to produce greater yields of light olefins, light aromatic compounds, or both. The present disclosure is directed to a process for steam enhanced catalytic cracking a hydrocarbon feed using a cracking catalyst, where the cracking catalyst is a core shell particle comprising a zeolite core and a mesoporous silica-alumina shell. The present disclosure is further directed to a method of making the cracking catalyst using a surfactant-directed sol-gel coating process with a microporous zeolite core. Without intending to be bound by any particular theory, it is believed that the mesoporous pore structure of the present cracking catalysts improves transport of larger reactants and reaction products to and from the zeolite active sites in the zeolite core. Additionally, it is believed that the acidity of the shell itself plays a significant role in the catalytic process. The processes and methods of the present disclosure can more efficiently convert crude oil and other hydrocarbon feeds to greater value petrochemical products and intermediates compared to other conventional refinery processes.

According to embodiments of the present disclosure, a process for converting a hydrocarbon feed may comprise contacting a hydrocarbon feed with steam in the presence of a cracking catalyst under steam enhanced catalytic cracking conditions. The contacting the hydrocarbon feed with the steam in the presence of the cracking catalyst may cause causes at least a portion of the hydrocarbon feed to undergo steam catalytic cracking reactions to produce a cracked effluent comprising $C_2$ to $C_4$ olefins, $C_6$ to $C_{10}$ aromatic compounds, or both. The cracking catalyst may comprise a nanoparticle. The nanoparticle may comprise a core and a shell. The core may comprise at least one zeolite particle, where the at least one zeolite particle may comprise ZSM-5 zeolites, Beta zeolites, Y-zeolites, or combinations of these zeolites. The shell may be mesoporous and may comprise silica ($SiO_2$), alumina ($Al_2O_3$), or silica and alumina.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
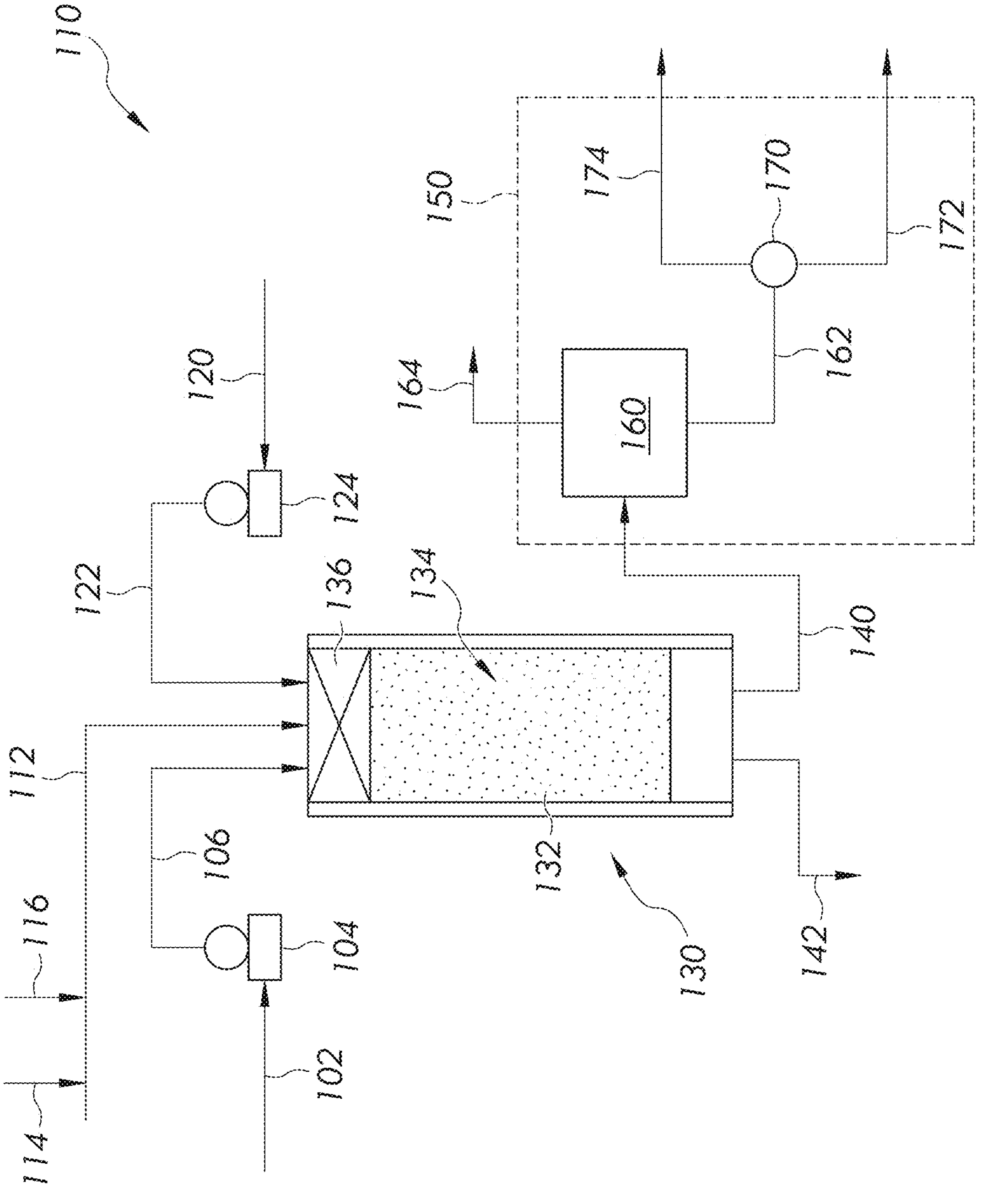
FIG. 1 schematically depicts a generalized flow diagram of a fixed bed reactor system for steam catalytic cracking of crude oil to produce olefins and aromatics, according to one or more embodiments shown and described in the present disclosure.

When describing the generalized flow diagrams of the figures, the numerous valves, temperature sensors, electronic controllers, and the like, which may be used and are well known to a person of ordinary skill in the art, may not be included. Further, accompanying components that are often included in systems such as those depicted in the figures, such as air supplies, heat exchangers, surge tanks, and the like also may not be depicted. However, a person of ordinary skill in the art understands that these components are within the scope of the present disclosure.

Additionally, the arrows in the generalized flow diagrams of the figures refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the generalized flow diagrams of the figures may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DESCRIPTION

The present disclosure is directed to cracking catalysts and processes for steam enhanced catalytic cracking of hydrocarbon feeds, such as crude oil, to produce greater yields of light olefins, light aromatic compounds, or both. A process of the present disclosure for converting a hydrocarbon feed may comprise contacting the hydrocarbon feed with steam in the presence of a cracking catalyst under steam enhanced catalytic cracking conditions. The contacting the hydrocarbon feed with the steam and the cracking catalyst may cause at least a portion of the hydrocarbon feed to undergo steam catalytic cracking reactions to produce a cracked effluent comprising $C_2$ to $C_4$ olefins, $C_6$ to $C_{10}$ aromatic compounds, or both. The cracking catalyst may be a nanoparticle comprising a core and a shell. The core may comprise one or more zeolite particles and have an outer surface. The shell may comprise mesoporous silica, alumina, or silica and alumina. The cracking catalyst may be produced by a surfactant-directed sol-gel coating process with a microporous zeolite core. The mesoporous shell of the cracking catalysts of the present disclosure can improve access to reactive sites on the zeolite core and reduce blockage by large molecules from the crude oil.

As used in the present disclosure, the term "atmospheric boiling point temperature" refers to the boiling point temperature of a compound at atmospheric pressure.

As used in the present disclosure, the terms "butenes" or "mixed butenes" are used interchangeably and refer to combinations of one or a plurality of isobutene, 1-butene, trans-2-butene, or cis-2-butene. As used throughout the present disclosure, the term "normal butenes" refers to a combination of one or a plurality of 1-butene, trans-2-butene, or cis-2-butene. As used throughout the present disclosure, the term "2-butenes" refers to trans-2-butene, cis-2-butene, or combinations of these isomers.

As used in the present disclosure, the term "catalyst" refers to any substance that increases the rate of a specific chemical reaction, such as but not limited to cracking reactions.

As used in the present disclosure, the term "cracking" refers to a chemical reaction where a molecule having carbon-carbon bonds is broken into more than one molecule by the breaking of one or more of the carbon-carbon bonds or a cyclic moiety having carbon-carbon bonds is converted to a non-cyclic moiety by the breaking or one or more of the carbon-carbon bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "crude oil" or "whole crude oil" is to be understood to mean a mixture of petroleum liquids, gases, or combinations of liquids and gases, including, in embodiments, impurities such as but not limited to sulfur-containing compounds, nitrogen-containing compounds, and metal compounds, that have not undergone significant separation or reaction processes. Crude oils are distinguished from fractions of crude oil. In certain embodiments, the crude oil feedstock may be a minimally treated light crude oil to provide a crude oil feedstock having total metals (Ni+V) content of less than 5 parts per million by weight (ppmw) and Conradson carbon residue of less than 5 wt. %.

As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in the present disclosure, the terms "downstream" and "upstream" refer to the positioning of components or unit operations of the processing system relative to a direction of flow of materials through the processing system. For example, a second component is considered "downstream" of a first component if materials flowing through the processing system encounter the first component before encountering the second component. Likewise, the first component is considered "upstream" of the second component if the materials flowing through the processing system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream or bleed stream may carry some of the effluent away, meaning that only a portion of the effluent may enter the downstream component or system. The terms "reaction effluent" and "reactor effluent" particularly refer to a stream that is passed out of a reactor or reaction zone.

As used in the present disclosure, the term "initial boiling point" or "IBP" of a composition refers to the temperature at which the constituents of the composition with the least boiling point temperatures begin to transition from the liquid phase to the vapor phase. As used in this disclosure, the term "end boiling point" or "EBP" of a composition refers to the temperature at which the greatest boiling temperature constituents of the composition transition from the liquid phase to the vapor phase. A hydrocarbon mixture may be characterized by a distillation profile expressed as boiling point temperatures at which a specific weight percentage of the composition has transitioned from the liquid phase to the vapor phase.

As used in the present disclosure, the term "light olefins" refers olefins having from 2 to 4 carbon atoms, such as but not limited to ethylene, propylene, and butenes.

As used in the present disclosure, the term "reactor" refers to any vessel, container, conduit, or the like, in which one or more chemical reactions, such as but not limited catalytic cracking reactions, may occur between one or more reactants optionally in the presence of one or more catalysts. One or more "reaction zones" may be disposed within a reactor. The term "reaction zone" refers to a volume where a particular chemical reaction takes place in a reactor.

As used in the present disclosure, the term "regenerated catalyst" refers to catalyst that has been contacted with reactants at reaction conditions and then regenerated in a regenerator regenerated through an in-place regeneration process to heat the catalyst to a greater temperature, oxidize and remove at least a portion of the coke or other organic contaminants from the catalyst to restore at least a portion of the catalytic activity of the catalyst, or both. The "regenerated catalyst" may have less coke or organic contaminants, a greater temperature, or both, compared to used catalyst and may have greater catalytic activity compared to used catalyst. The "regenerated catalyst" may have more coke and lesser catalytic activity compared to fresh catalyst that has not been contacted with reactants a cracking reaction zone and then regenerated.

The term "residence time" refers to the amount of time that reactants are in contact with a catalyst, at reaction conditions, such as at the reaction temperature.

As used in the present disclosure, the terms "separation unit" and "separator" refer to any separation device or plurality of separation devices that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

As used in the present disclosure, the term "used catalyst" refers to catalyst that has been contacted with reactants at reaction conditions, but has not been regenerated in a regenerator or through a regeneration process. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "WABT" means weighted average bed temperature. WABT may be calculated according to the following Equation 1 (EQU. 1).

$$WABT = \sum_{i=1}^{N}(WABT_i \times Wc_i) \quad \text{EQU. 1}$$

In EQU. 1, $WABT_i$ is the WABT for a particular section of catalyst bed, N is the number of catalyst beds, and $Wc_1$ is the weight fraction of the $i^{th}$ section of the catalyst bed based on the total weight of the catalyst bed.

It should further be understood that streams may be named for the components of the stream, and the component for which the stream is named may be the major constituent of the stream (such as the constituent comprising the greatest fraction of the stream, excluding inert diluent gases, such as nitrogen, noble gases, and the like, unless otherwise stated). It should also be understood that components of a stream are disclosed as passing from one system component to another when a stream comprising that component is disclosed as passing from that system component to another. For example, a disclosed "hydrocarbon stream" passing to a first system component or from a first system component to a second system component should be understood to equivalently disclose "hydrocarbons" passing to the first system component or passing from a first system component to a second system component.

Conventional refinery systems include multiple unit operations. Steam enhanced catalytic cracking of crude oil directly can reduce the complexity of the refining process, such as by reducing the number of unit operations needed to process the crude oil. Steam enhanced catalytic cracking typically uses ZSM-5 zeolites, which typically have a microporous pore structure having an average pore size of less than or equal to 2 nanometers (nm). However, when cracking crude oil directly, crude oil can include a substantial amount of large molecules, such as up to 30 weight percent (wt. %) hydrocarbons having boiling point temperatures greater than or equal to 500° C. These large hydrocarbon molecules are not generally accessible to reactive sites in conventional microporous zeolites. Large molecules in crude oil can also plug the pores in the conventional zeolites, which can reduce the effectiveness of the conventional zeolites for steam enhanced catalytic cracking of crude oil and other hydrocarbon feeds.

The present disclosure is directed to steam catalytic cracking of crude oil using a cracking catalyst to convert the crude oil to greater value hydrocarbon products, such as but not limited to light olefins, aromatic compounds, or combinations of these. A process for converting a hydrocarbon feed may comprise contacting the hydrocarbon feed with steam in the presence of a cracking catalyst under steam enhanced catalytic cracking conditions. The contacting the hydrocarbon feed with the steam and the cracking catalyst may cause at least a portion of the hydrocarbon feed to undergo steam catalytic cracking reactions to produce a cracked effluent comprising $C_2$ to $C_4$ olefins, $C_6$ to $C_{10}$ aromatic compounds, or both. The cracking catalyst may be a nanoparticle comprising a core and a shell. The core may comprise one or more zeolite particles and have an outer surface. The shell may comprise mesoporous silica, alumina, or silica and alumina. The cracking catalyst may be produced by a surfactant-directed sol-gel coating process with a microporous zeolite core. The mesoporous shell of the cracking catalysts of the present disclosure can improve access to reactive sites on the zeolites in the core and reduce blockage by large molecules from the crude oil.

Referring now to FIG. 1, a process 100 of the present disclosure for converting a hydrocarbon feed 102 to a cracked effluent 140 may include contacting the hydrocarbon feed 102 with steam in the presence of the cracking catalyst 132 at steam enhanced catalytic cracking conditions.

The hydrocarbon feed 102 may include one or more heavy oils, such as but not limited to crude oil, bitumen, oil sand, shale oil, coal liquids, vacuum residue, tar sands, other heavy oil streams, or combinations of these heavy oils. It should be understood that, as used in this disclosure, a "heavy oil" refers to a raw hydrocarbon, such as whole crude oil, which has not been previously processed through distillation, or may refer to a hydrocarbon oil, which has undergone some degree of processing prior to being introduced to the process 100 as the hydrocarbon feed 102. The hydrocarbon feed 102 may have a density of greater than or equal to 0.80 grams per milliliter. The hydrocarbon feed 102 may have an end boiling point (EBP) of greater than 565° C. The hydrocarbon feed 102 may have a concentration of nitrogen of less than or equal to 3000 parts per million by weight (ppmw).

In embodiments, the hydrocarbon feed 102 may be a crude oil, such as whole crude oil, or synthetic crude oil. The crude oil may have an American Petroleum Institute (API) gravity of from 22 degrees to 52 degrees, such as from 25 degrees to 52 degrees, from 22 degrees to 40 degrees, from 25 degrees to 50 degrees, or from 25 degrees to 40 degrees. In embodiments, the hydrocarbon feed 102 may include an extra light crude oil, a light crude oil, a heavy crude oil, or combinations of these. In embodiments, the hydrocarbon feed 102 can be a light crude oil, such as but not limited to an Arab heavy crude oil, an Arab medium crude oil, an Arab light (AL) export crude oil, an Arab extra light (AXL) crude oil, or an Arab super light crude oil. Example properties for an exemplary grade of AL crude oil are provided in Table 1.

TABLE 1

Example of AL Export Crude Oil

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |

TABLE 1-continued

Example of AL Export Crude Oil

| Analysis | Units | Value | Test Method |
|---|---|---|---|
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range >540° C. | wt. % | 25.8 | ASTM D7169 |

Weight percentages in Table 1 are based on the total weight of the crude oil.

In embodiments, the hydrocarbon feed 102 may be an Arab Extra Light (AXL) crude oil. An example boiling point distribution for an exemplary grade of an AXL crude oil is provided in Table 2.

TABLE 2

Example of AXL Export Crude Oil

| Property | Units | Value | Test Method |
|---|---|---|---|
| 0.1% Boiling Point (BP) | ° C. | 21 | ASTM D7169 |
| 5% BP | ° C. | 65 | ASTM D7169 |
| 10% BP | ° C. | 96 | ASTM D7169 |
| 15% BP | ° C. | 117 | ASTM D7169 |
| 20% BP | ° C. | 141 | ASTM D7169 |
| 25% BP | ° C. | 159 | ASTM D7169 |
| 30% BP | ° C. | 175 | ASTM D7169 |
| 35% BP | ° C. | 196 | ASTM D7169 |
| 40% BP | ° C. | 216 | ASTM D7169 |
| 45% BP | ° C. | 239 | ASTM D7169 |
| 50% BP | ° C. | 263 | ASTM D7169 |
| 55% BP | ° C. | 285 | ASTM D7169 |
| 60% BP | ° C. | 308 | ASTM D7169 |
| 65% BP | ° C. | 331 | ASTM D7169 |
| 70% BP | ° C. | 357 | ASTM D7169 |
| 75% BP | ° C. | 384 | ASTM D7169 |
| 80% BP | ° C. | 415 | ASTM D7169 |
| 85% BP | ° C. | 447 | ASTM D7169 |
| 90% BP | ° C. | 486 | ASTM D7169 |
| 95% BP | ° C. | 537 | ASTM D7169 |
| End Boiling Point (EBP) | ° C. | 618 | ASTM D7169 |

The hydrocarbon feed 102 may have a sulfur content of from 0.05 wt. % to 3 wt. %. In embodiments, the hydrocarbon feed 102 may have a sulfur content of from 0.05 wt. % to 2.75 wt. %, from 0.05 wt. % to 2.50 wt. %, from 0.05 wt. % to 2.25 wt. %, from 0.05 wt. % to 2.00 wt. %, from 0.1 wt. % to 3 wt. %, from 0.5 wt. % to 3 wt. %, from 1 wt. % to 3 wt. %, from 1.5 wt. % to 3 wt. %, from 1.5 wt. % to 2.5 wt. %, or any subset thereof.

When the hydrocarbon feed 102 comprises a crude oil, the crude oil may be a whole crude or may be a crude oil that has undergone at least some processing, such as desalting, solids separation, scrubbing, or other process that removes contaminants from the crude oil but does not change the hydrocarbon composition of the crude oil. In embodiments, the hydrocarbon feed 102 may be a de-salted crude oil that has been subjected to a de-salting process. In embodiments, the hydrocarbon feed 102 may include a crude oil that has not undergone pretreatment, separation (such as distillation), or other operation or process that changes the hydrocarbon composition of the crude oil prior to introducing the crude oil to the process 100.

In embodiments, the hydrocarbon feed 102 can be a crude oil having a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperatures at which a given weight percentage of the hydrocarbon feed stream boils. In embodiments, the crude oil may have one or more of a 5 wt. % boiling temperature of less than or equal to 150° C.; a 25 wt. % boiling temperature of less than or equal to 225° C. or less than or equal to 200° C.; a 50 wt. % boiling temperature of less than or equal to 500° C., less than or equal 450° C., or less than or equal to 400° C.; a 75 wt. % boiling temperature of less than 600° C., less than or equal to 550° C.; a 95 wt. % boiling temperature of greater than or equal to 550° C. or greater than or equal to 600° C.; or combinations of these. In embodiments, the crude oil may have one or more of a 5 wt. % boiling temperature of from 0° C. to 100° C.; a 25 wt. % boiling temperature of from 150° C. to 250° C., a 50 wt. % boiling temperature of from 250° C. to 400° C., a 75 wt. % boiling temperature of from 350° C. to 600° C. and an end boiling point temperature of from 500° C. to 1000° C., such as from 500° C. to 800° C.

Referring again to FIG. 1, one embodiment of a steam catalytic cracking system 110 for steam catalytic cracking a hydrocarbon feed 102 is schematically depicted. The steam catalytic cracking system 110 may include at least one steam catalytic cracking reactor 130. The steam catalytic cracking reactor 130 may include one or more fixed bed reactors, fluid bed reactors, batch reactors, fluid catalytic cracking (FCC) reactors, moving bed catalytic cracking reactors, or combinations of these. In embodiments, the steam catalytic cracking reactor 130 may be a fixed bed reactor. In embodiments, the steam catalytic cracking reactor 130 may include a plurality of fixed bed reactors operated in a swing mode. Operation of the steam catalytic cracking reactor 130 will be described herein in the context of a fixed bed reactor. However, it is understood that other types of reactors, such as fluid bed reactors, batch reactors, FCC reactors, or moving bed reactors, may also be used to contact the hydrocarbon feed 102 with the cracking catalyst to conduct the steam catalytic cracking of the process disclosed herein.

The steam catalytic cracking reactor 130 may operate to contact the hydrocarbon feed 102 with steam in the presence of the cracking catalyst 132 of the present disclosure to produce a cracked effluent 140 comprising light olefins, aromatic compounds, or combinations of these. As previously discussed, the steam catalytic cracking reactor 130 may be a fixed bed catalytic cracking reactor that may include the cracking catalyst 132 disposed within a steam catalytic cracking zone 134. The steam catalytic cracking reactor 130 may include a porous packing material 136, such as silica carbide packing or Kaolin clay, disposed upstream of the steam catalytic cracking zone 134. The porous packing material 136 may ensure sufficient heat transfer to the hydrocarbon feed 102 and steam prior to conducting the steam catalytic cracking reaction in the steam catalytic cracking zone 134.

Referring again to FIG. 1, the hydrocarbon feed 102 may be introduced to the steam catalytic cracking reactor 130. In embodiments, the hydrocarbon feed 102 may be introduced directly to the steam catalytic cracking system 110, such as by passing the crude oil of the hydrocarbon feed 102 to the steam catalytic cracking reactor 130 without passing the hydrocarbon feed 102 to any separation system or unit operation that changes the hydrocarbon composition of the hydrocarbon feed 102. In embodiments, the hydrocarbon feed 102 may be processed upstream of the steam catalytic cracking system 110 to remove contaminants, such as but not limited to nitrogen compounds, sulfur-containing compounds, heavy metals, solids, or other contaminants that may reduce the effectiveness of the cracking catalyst.

The processes disclosed herein can include introducing the hydrocarbon feed 102 to the steam catalytic cracking system 110, such as introducing the hydrocarbon feed 102 to the steam catalytic cracking reactor 130. Introducing the hydrocarbon feed 102 to the steam catalytic cracking reactor 130 may include heating the hydrocarbon feed 102 to a temperature of from 35° C. to 150° C. and then passing the hydrocarbon feed 102 to the steam catalytic cracking reactor 130. In embodiments, the hydrocarbon feed 102 may be heated to a temperature of from 40° C. to 150° C., from 45° C. to 150° C., from 50° C. to 150° C., from 35° C. to 145° C., from 40° C. to 145° C. from 45° C. to 145° C., from 35° C. to 140° C., from 40° C. to 140° C., or from 45° C. to 140° C.

In embodiments, passing the hydrocarbon feed 102 to the steam catalytic cracking reactor 130 may include passing the hydrocarbon feed 102 to a feed pump 104, where the feed pump 104 may increase the pressure of the hydrocarbon feed 102 and convey the hydrocarbon feed 102 to the steam catalytic cracking reactor 130. The flowrate of the feed pump 104 may be adjusted so that the hydrocarbon feed 102 is injected into the steam catalytic cracking reactor 130 at a gas hourly space velocity of greater than or equal to 0.1 per hour ($h^{-1}$) or greater than or equal to 0.25 $h^{-1}$. The hydrocarbon feed 102 may be injected into the steam catalytic cracking reactor 130 at a gas hourly space velocity of less than or equal to 50 $h^{-1}$, less than or equal to 25 $h^{-1}$, less than or equal to 20 $h^{-1}$, less than or equal to 14 $h^{-1}$, less than or equal to 9 $h^{-1}$, or less than or equal to 5 $h^{-1}$. The hydrocarbon feed 102 may be injected into the steam catalytic cracking reactor 130 at a gas hourly space velocity of from 0.1 $h^{-1}$ to 50 $h^{-1}$, from 0.1 $h^{-1}$ to 25 $h^{-1}$, from 0.1 $h^{-1}$ to 20 $h^{-1}$, from 0.1 $h^{-1}$ to 14 $h^{-1}$, from 0.1 $h^{-1}$ to 9 $h^{-1}$, from 0.1 $h^{-1}$ to 5 $h^{-1}$, from 0.1 $h^{-1}$ to 4 $h^{-1}$, from 0.25 $h^{-1}$ to 50 $h^{-1}$, from 0.25 $h^{-1}$ to 25 $h^{-1}$, from 0.25 $h^{-1}$ to 20 $h^{-1}$, from 0.25 $h^{-1}$ to 14 $h^{-1}$, from 0.25 $h^{-1}$ to 9 $h^{-1}$, from 0.25 $h^{-1}$ to 5 $h^{-1}$, from 0.25 $h^{-1}$ to 4 $h^{-1}$, from 1 $h^{-1}$ to 50 $h^{-1}$, from 1 $h^{-1}$ to 25 $h^{-1}$, from 1 $h^{-1}$ to 20 $h^{-1}$, from 1 $h^{-1}$ to 14 $h^{-1}$, from 1 $h^{-1}$ to 9 $h^{-1}$, or from 1 $h^{-1}$ to 5 $h^{-1}$ via feed inlet line 106. The hydrocarbon feed 102 may be further pre-heated in the feed inlet line 106 to a temperature of from 100° C. to 250° C. before injecting the hydrocarbon feed 102 into the steam catalytic cracking reactor 130.

Water 120 may be injected to the steam catalytic cracking reactor 130 through water feed line 122 via the water feed pump 124. The water feed line 122 may be pre-heated to heat the water 120 at to a temperature of from 50° C. to 450° C., from 50° C. to 300° C., from 100° C. to 450° C., from 100° C. to 300° C., from 150° C. to 450° C., from 150° C. to 300° C., from 200° C. to 450° C., from 200° C. to 300° C., from 50° C. to 175° C., from 50° C. to 150° C., from 60° C. to 175° C., or from 60° C. to 170° C. The water 120 may be converted to steam in water feed line 122 or upon contact with the hydrocarbon feed 102 in the steam catalytic cracking reactor 130. The flowrate of the water feed pump 124 may be adjusted to deliver the water 120 (liquid, steam, or both) to the steam catalytic cracking reactor 130 at a gas hourly space velocity of greater than or equal to 0.1 $h^{-1}$, greater than or equal to 0.5 $h^{-1}$, greater than or equal to 1 $h^{-1}$, greater than or equal to 5 $h^{-1}$, greater than or equal to 6 $h^{-1}$, greater than or equal to 10 $h^{-1}$, or even greater than or equal to 15 $h^{-1}$. The water 120 may be introduced to the steam catalytic cracking reactor 130 at a gas hourly space velocity of less than or equal to 100 $h^{-1}$, less than or equal to 75 $h^{-1}$, less than or equal to 50 $h^{-1}$, less than or equal to 30 $h^{-1}$, or less than or equal to 20 $h^{-1}$. The water 120 may be introduced to the steam catalytic cracking reactor 130 at a gas hourly space velocity of from 0.1 $h^{-1}$ to 100 $h^{-1}$, from 0.1 $h^{-1}$ to 75 $h^{-1}$, from 0.1 $h^{-1}$ to 50 $h^{-1}$, from 0.1 $h^{-1}$ to 30 $h^{-1}$, from 0.1 $h^{-1}$ to 20 $h^{-1}$, from 1 $h^{-1}$ to 100 $h^{-1}$, from 1 $h^{-1}$ to 75 $h^{-1}$, from 1 $h^{-1}$ to 50 $h^{-1}$, from 1 $h^{-1}$ to 30 $h^{-1}$, or from 1 $h^{-1}$ to 20 $h^{-1}$.

The steam from injection of the water 120 into the steam catalytic cracking reactor 130 may reduce the hydrocarbon partial pressure, which may have the dual effects of increasing yields of light olefins (e.g., ethylene, propylene and butene) as well as reducing coke formation on the cracking catalyst. Not intending to be limited by any particular theory, it is believed that light olefins like propylene and butenes are mainly generated from catalytic cracking reactions following the carbonium ion mechanism, and as these are intermediate products, they can undergo secondary reactions such as hydrogen transfer and aromatization (leading to coke formation). The steam may increase the yield of light olefins by suppressing these secondary bi-molecular reactions, and may reduce the concentration of reactants and products, which favor selectivity towards light olefins. The steam may also suppress secondary reactions that are responsible for coke formation on catalyst surfaces, which is good for catalysts to maintain high average activation. These factors may show that a large steam-to-oil weight ratio may be beneficial to the production of light olefins.

The mass flow rate of the water 120 to the steam catalytic cracking reactor 130 may be less than the mass flow rate of the hydrocarbon feed 102 to the steam catalytic cracking reactor 130. In embodiments, a mass flow ratio of the water 120 to the hydrocarbon feed 102 introduced to the steam catalytic cracking reactor 130 can be less than 1, such as less than or equal to 0.9, less than or equal to 0.8, less than or equal to 0.7, or less than or equal to 0.6. In embodiments, the mass flow ratio of the water 120 to the hydrocarbon feed 102 introduced to the steam catalytic cracking reactor 130 can be from 0.2 to less than 1, from 0.2 to 0.9, from 0.2 to 0.8, from 0.2 to 0.7, from 0.2 to 0.6, from 0.3 to less than 1, from 0.3 to 0.9, from 0.3 to 0.8, from 0.3 to 0.7, from 0.3 to 0.6, from 0.4 to less than 1, from 0.4 to 0.9, from 0.4 to 0.8, from 0.4 to 0.7, from 0.4 to 0.6, from 0.5 to less than 1, from 0.5 to 0.9, from 0.5 to 0.8, from 0.5 to 0.7, from 0.5 to 0.6. In embodiments, the mass flow ratio of the water 120 to the hydrocarbon feed 102 introduced to the steam catalytic cracking reactor 130 can be about 0.5. The water may be present as steam in the steam catalytic cracking reactor 130.

Referring again to FIG. 1, the steam catalytic cracking system 110 may be operable to contact the hydrocarbon feed 102 with steam (from water 120) in the presence of the cracking catalyst in the steam catalytic cracking reactor 130 under reaction conditions sufficient to cause at least a portion of the hydrocarbons from the hydrocarbon feed 102 to undergo one or more cracking reactions to produce a cracked effluent 140 comprising light olefins, light aromatic compounds, or both. In embodiments, the cracked effluent 140 may comprise light olefins, which may include but are not limited to ethylene, propylene, butenes, or combinations of these. In embodiments, the cracked effluent 140 may comprise light aromatic compounds, which refers to compounds containing an aromatic ring structure and having less than or equal to 10 carbon atoms. The light aromatic compounds in the cracked effluent 140 may include but are not limited to benzene, toluene, ethylbenzene, xylenes, or other light aromatic compounds.

The steam catalytic cracking reactor 130 may be operated at a weighted average bed temperature (WABT) temperature of greater than or equal to 100° C., greater than or equal to 250° C., greater than or equal to 500° C. greater than or equal to 525° C., greater than or equal to 550° C., greater than or equal to 575° C., or even greater than or equal to 600° C. The steam catalytic cracking reactor 130 may be operated at a WABT of less than or equal to 800° C., less than or equal to 700° C., less than or equal to 750° C., less than or equal to 700° C., or even less than or equal to 675° C. The steam catalytic cracking reactor 130 may be operated at a WABT of from 100° C. to 800° C., from 100° C. to 700° C., from 100° C. to 600° C., from 250° C. to 800° C., from 525° C. to 800° C., from 525° C. to 750° C., from 525° C. to 700° C., from 525° C. to 675° C., from 550° C. to 750° C., from 550° C. to 700° C., from 550° C. to 675° C., from 575° C. to 750° C., from 575° C. to 700° C., from 575° C. to 675° C., from 600° C. to 750° C., from 600° C. to 700° C., or from 600° C. to 675° C. In embodiments, the steam catalytic cracking reactor 130 may be operated at a WABT of about 675° C. The process may operate at atmospheric pressure (approximately from 100 kilopascals (kPa) to 200 kPa).

The methods of the present disclosure may include contacting the hydrocarbon feed 102 with the steam (water 120) in the presence of the cracking catalyst 132 in the steam catalytic cracking reactor 130 for a residence time sufficient to convert at least a portion of the hydrocarbon compounds in the hydrocarbon feed 102 to light olefins, light aromatic compounds, or both. In embodiments, the methods may include contacting the hydrocarbon feed 102 with the steam (water 120) in the presence of the cracking catalyst 132 in the steam catalytic cracking reactor 130 for a residence time of from 1 second to 60 seconds, such as from 1 second to 30 seconds, from 1 second to 10 seconds, or about 10 seconds.

When the steam catalytic cracking reactor 130 is a fixed bed reactor, the steam catalytic cracking reactor 130 may be operated in a semi-continuous manner. For example, during a conversion cycle, the steam catalytic cracking reactor 130 may be operated with the hydrocarbon feed 102 and water 120 flowing to the steam catalytic cracking reactor 130 for a period of time. After the period of the time, the cracking catalyst may be regenerated. Each conversion cycle of the steam catalytic cracking reactor 130 may be from 2 to 24 hours, from 2 to 20 hours, from 2 to 16 hours, from 2 to 12 hours, from 2 to 10 hours, from 2 to 8 hours, from 4 to 24 hours, from 4 to 20 hours, from 4 to 16 hours, from 4 to 12 hours, from 4 to 10 hours, from or 4 to 8 hours before switching off the feed pump 104 and the water feed pump 124 to cease the flow of the hydrocarbon feed 102 and water 120 to the steam catalytic cracking reactor 130.

At the end of the conversion cycle, the flow of hydrocarbon feed 102 and water 120 may be stopped and the cracking catalyst 132 may be regenerated during a regeneration cycle. In embodiments, the steam catalytic cracking system 110 may include a plurality of fixed bed steam catalytic cracking reactors 130, which may be operated in parallel or in series. In embodiments, the steam catalytic cracking system 110 may include 1, 2, 3, 4, 5, 6, or more than 6 steam catalytic cracking reactors 130, which may be operated in series or in parallel. With a plurality of steam catalytic cracking reactors 130 operating in parallel, one or more of the steam catalytic cracking reactors 130 can continue in a conversion cycle while one or more of the other steam catalytic cracking reactors 130 are taken off-line for regeneration of the cracking catalyst 132, thus maintaining continuous operation of the steam catalytic cracking system 110.

Referring again to FIG. 1, during a regeneration cycle, the steam catalytic cracking reactor 130 may be operated to regenerate the cracking catalyst 132. The cracking catalyst 132 may be regenerated to remove coke deposits accumulated during the conversion cycle. To regenerate the cracking catalyst 132, hydrocarbon gas and liquid products produced by the steam catalytic cracking process may be evacuated from the steam catalytic cracking reactor 130. Nitrogen gas may be introduced to the steam catalytic cracking reactor 130 through gas inlet line 112 to evacuate the hydrocarbon gas and liquid products from the fixed bed steam catalytic cracking reactor 130. Nitrogen may be introduced to the steam catalytic cracking reactor 130 at gas hourly space velocity of from 10 per hour ($h^{-1}$) to 100 $h^{-1}$.

Following evacuation of the hydrocarbon gases and liquids, air may be introduced to the steam catalytic cracking reactor 130 through the gas inlet line 112 at a gas hourly space velocity of from 10 $h^{-1}$ to 100 $h^{-1}$. The air may be passed out of the steam catalytic cracking reactor 130 through air outlet line 142. While passing air through the cracking catalyst 132 in the steam catalytic cracking reactor 130, the temperature of the steam catalytic cracking reactor 130 may be increased from the reaction temperature to a regeneration temperature of from 650° C. to 750° C. for a period of from 3 hours to 5 hours. The gas produced by air regeneration of the cracking catalyst 132 may be passed out of the steam catalytic cracking reactor 130 and may be analyzed by an in-line gas analyzer to detect the presence or concentration of carbon dioxide produced through de-coking of the cracking catalyst 132. Once the carbon dioxide concentration in the gases passing out of the steam catalytic cracking reactor 130 are reduced to less than 0.1% by weight, or even less than 0.05% by weight, as determined by the in-line gas analyzer, the temperature of the steam catalytic cracking reactor 130 may be decreased from the regeneration temperature back to the reaction temperature. The air flow through gas inlet line 112 may be stopped. Nitrogen gas may be passed through the cracking catalyst 132 for 15 minutes to 30 minutes to remove air from the steam catalytic cracking reactor 130. Following treatment with nitrogen, the flows of the hydrocarbon feed 102 and water 120 may be resumed to begin another conversion cycle of steam catalytic cracking reactor 130. Although described herein in the context of a fixed bed reactor system, it is understood that the steam catalytic cracking reactor 130 can be a different type of reactor, such as a fluidized bed reactor, a moving bed reactor, a batch reactor, an FCC reactor, or combinations of these.

Figure 2:
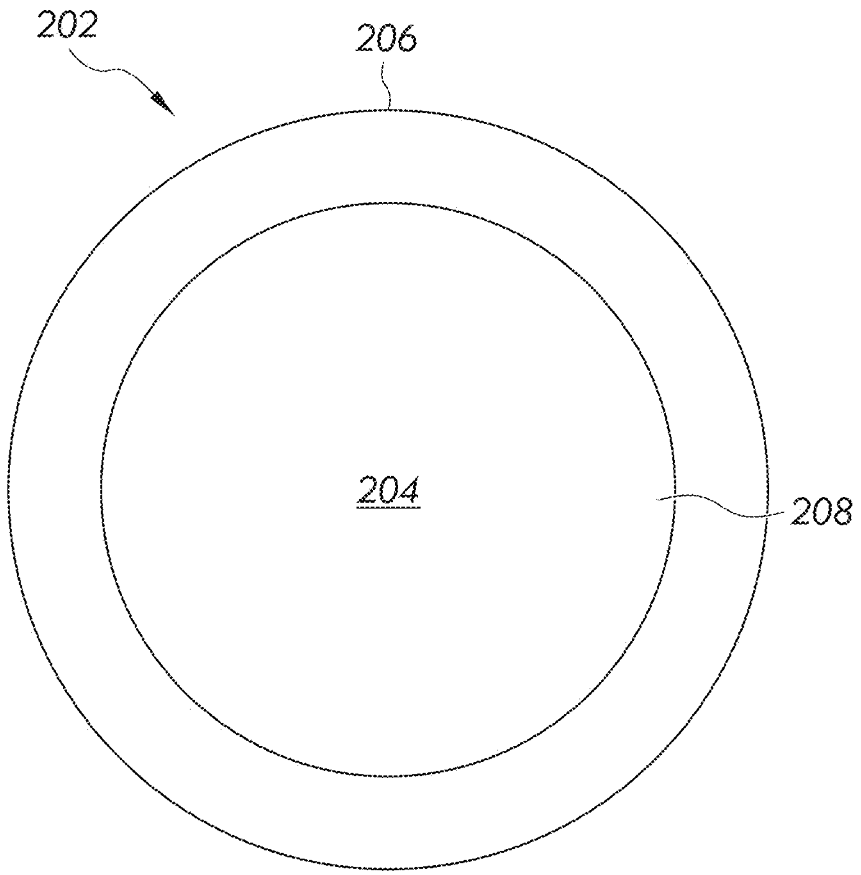
FIG. 2 schematically depicts a cross-sectional diagram of a cracking catalyst comprising a core and a plurality of fibers extending radially outward from the core, according to one or more embodiments shown and described in the present disclosure.

Referring now to FIG. 2, the cracking catalyst 202 may comprise a nanoparticle comprising a core 204 and shell 206. The core may comprise at least one zeolite particle 208, where the at least one zeolite particle 208 may comprise ZSM-5 zeolites, Beta zeolites, Y-zeolites, or combinations of these zeolites. The shell 206 may be mesoporous and comprise silica ($SiO_2$), alumina ($Al_2O_3$), or silica and alumina.

As described above, the core 204 may comprise at least one zeolite particle 208. In embodiments, the core 204 may comprise more than one zeolite particle. In embodiments, the core 204 may comprise a single zeolite particle 208. The core 204 may further comprise silica and alumina. In embodiments, the core 204 may consist of a single zeolite particle 208.

The at least one zeolite particle 208 may comprise ZSM-5 zeolites, Beta zeolites, Y-zeolites, or combinations of these zeolites. In embodiments, the at least one zeolite particle 208 may comprise a Beta zeolite, a Y-zeolite, or Beta zeolite and Y-zeolite. Without being limited by theory, it is believed that the use of Beta zeolite or Y-zeolite in the core can result in the production of more butenes compared to the use of ZSM-5 in the core. It is further believed that the use of ZSM-5 in the core may result in the production of more ethylene and propylene compared to the use of Beta or Y zeolites in the core.

The zeolite particles 208 may have a molar ratio of silica to alumina of from 23 to 500. In embodiments, the zeolite particles 208 may have a molar ratio of silica to alumina of from 23 to 400, from 23 to 300, from 23 to 200, from 23 to 100, from 23 to 80, from 23 to 60, from 23 to 50, from 23 to 40, from 23 to 35, from 30 to 500, from 30 to 400, from 30 to 300, from 30 to 200, from 30 to 100, from 30 to 80, from 30 to 60, or any subset thereof. Without being limited by theory, it is believed that the activity and selectivity of the cracking catalyst may be at least partially controlled by the molar ratio of silica to alumina in the zeolite particle 208.

The zeolite particle 208 disposed in the cores 204 may have an average particle size of from 100 nm to 500 nm. In embodiments, the zeolite particles 208 may have an average particle size of from 100 nm to 400 nm, from 100 nm to 300 nm, from 200 nm to 500 nm, from 200 nm to 400 nm, from 200 nm to 300 nm, from 200 nm to 275 nm, from 200 nm to 250 nm, from 200 nm to 225 nm, from 225 nm to 300 nm, from 225 nm to 275 nm, from 225 nm to 250 nm, from 250 nm to 300 nm from 250 nm to 275 nm, from 275 nm to 300 nm, or any subset thereof. In embodiments, the zeolite particles 208 may be spherical and the average particle size may be equal to the diameter.

The zeolite particles 208 may be microporous. In embodiments, the zeolite particles 208 may have an average pore size of from 1 angstrom (Å) (0.1 nm) to 20 Å (2.0 nm), from 1 Å (0.1 nm) to 18 Å (1.8 nm), from 1 Å (0.1 nm) to 15 Å (1.5 nm), from 1 Å (0.1 nm) to 10 Å (1.0 nm), from 1 Å (0.1 nm) to 5 Å (0.5 nm), from 5 Å (0.5 nm) to 20 Å (2.0 nm), from 5 Å (0.5 nm) to 18 Å (1.8 nm), from 5 Å (0.5 nm) to 15 Å (1.5 nm), from 5 Å (0.5 nm) to 10 Å (1.0 nm), from 10 Å (1.0 nm) to 20 Å (2.0 nm), from 10 Å (1.0 nm) to 18 Å (1.8 nm), from 10 Å (1.0 nm) to 15 Å (1.5 nm), from 15 Å (1.5 nm) to 20 Å (2.0 nm), from 15 Å (1.5 nm) to 18 Å (1.8 nm), or any subset thereof.

As described above, the shell 206 may comprise silica ($SiO_2$), alumina ($Al_2O_3$), or silica and alumina. In embodiments, the shell 206 may comprise both silica and alumina. In embodiments, the silica and alumina of the shell may form a matrix. The shell 206 may have a molar ratio of silica to alumina of from 0 to 500. In embodiments, the shell 206 may have a molar ratio of silica to alumina of from 0 to 400, from 0 to 300, from 0 to 200, from 0 to 100, from 0 to 75, from 0 to 50, from 0 to 25, from 0 to 1, from 10 to 500, from 10 to 400, from 10 to 300, from 10 to 200, from 10 to 100, from 10 to 50, from 5 to 16, from 5 to 14, from 5 to 12, from 5 to 10, from 5 to 8, from 5 to 6, from 7 to 16, from 9 to 16, from 11 to 16, from 13 to 16, from 15 to 16, from 7 to 13, from 9 to 11, or any subset thereof. Without being limited by theory, it is believed that the activity and selectivity of the cracking catalyst 202 may be sensitive to the molar ratio of silica to alumina in the shell 206.

The shell 206 may have a thickness of from 1 nm to 100 nm. In embodiments, the shell 206 may have a thickness of from 1 nm to 75 nm, from 1 nm to 50 nm, from 1 nm to 30 nm, from 1 nm to 26 nm, from 5 nm to 100 nm, from 5 nm to 75 nm, from 5 nm to 30 nm, from 5 nm to 26 nm, from 8 nm to 100 nm, from 8 nm to 50 nm, from 8 nm to 30 nm, from 8 nm to 26 nm, or any subset thereof. The shell 206 may have a uniform thickness. In embodiments, the thickness of the shell may vary by less than 20%, less than 10%, less than 5%, less than 2.5%, or less than 1%, between the thickest portion of the shell and the thinnest portion of the shell.

As discussed above, the shell 206 may be mesoporous. In embodiments, the shell 206 may have an average pore diameter of from 2 nm to 100 nm, from 2 nm to 50 nm, from 2 nm to 25 nm, from 2 nm to 10 nm, from 2 nm to 8 nm, from 2 nm to 6 nm, from 2 nm to 4 nm, from 3 nm to 5 nm, or any subset thereof.

In embodiments, the shell 206 may comprise a mesoporous structure with pores extending radially normal to the core 204. In embodiments, the shell 206 may comprise a mesoporous structure with pores extending radially outward from the surface of the core 204.

In embodiments, the shell 206 may comprise less than 50 wt. %, less than 25 wt. %, less than 5 wt. %, less than 1 wt. %, or even less than 0.001 wt. % of a zeolite phase, such as ZSM-5. Beta-zeolite, or both. In embodiments, the shell 206 may be non-zeolitic.

The shell 206 may surround at least 50% of an exterior of the at least one zeolite particle 208 of the core 204. In embodiments, the shell 206 may surround at least 75%, at least 90%, at least 95%, at least 99%, or even 100% of the exterior of the at least one zeolite particle 208.

The cracking catalyst 202 may have a mesoporous pore volume of at least 0.020 cm 3/g. In embodiments, the cracking catalyst 202 may have a mesoporous pore volume of from 0.020 $cm^3/g$ to 1.000 $cm^3/g$, from 0.020 $cm^3/g$ to 0.750 $cm^3/g$, from 0.020 $cm^3/g$ to 0.500 $cm^3/g$, from 0.020 to 0.400 $cm^3/g$, from 0.020 $cm^3/g$ to 0.300 $cm^3/g$, from 0.020 $cm^3/g$ to 0.200 $cm^3/g$, from 0.020 $cm^3/g$ to 0.100 $cm^3/g$, from 0.060 $cm^3/g$ to 1.000 $cm^3/g$, from 0.060 $cm^3/g$ to 0.750 $cm^3/g$, from 0.060 $cm^3/g$ to 0.500 $cm^3/g$, from 0.060 to 0.400 $cm^3/g$, from 0.060 $cm^3/g$ to 0.300 $cm^3/g$, from 0.060 $cm^3/g$ to 0.200 $cm^3/g$, from 0.060 $cm^3/g$ to 0.100 $cm^3/g$, from 0.100 $cm^3/g$ to 1.000 $cm^3/g$, from 0.100 $cm^3/g$ to 0.750 $cm^3/g$, from 0.100 $cm^3/g$ to 0.500 $cm^3/g$, from 0.100 $cm^3/g$ to 0.400 $cm^3/g$, from 0.150 $cm^3/g$ to 1.000 $cm^3/g$, from 0.150 $cm^3/g$ to 0.750 $cm^3/g$, from 0.150 $cm^3/g$ to 0.500 $cm^3/g$, from 0.150 $cm^3/g$ to 0.400 $cm^3/g$, from 0.150 $cm^3/g$ to 0.300 $cm^3/g$, from 0.150 $cm^3/g$ to 0.200 $cm^3/g$, from 0.270 $cm^3/g$ to 1.000 $cm^3/g$, or any subset thereof. The mesoporous pore volume of the cracking catalyst 202 may be calculated from the nitrogen adsorption isotherm using the standard Barrett-Joyner-Halenda ("BJH") method. Properties of the cracking catalyst-such as the mesoporous pore volume, volume ratio of mesopore volume to micropore volume, mesoporous surface area, or other property-refer to the properties of the cracking catalyst as a whole, including consideration of both the core 204 and the shell 206.

The cracking catalyst 202 may have a volume ratio of mesoporous pore volume to microporous pore volume of at least 0.2. In embodiments, the cracking catalyst 202 may have a volume ratio of mesoporous pore volume of from 0.2 to 100, from 0.2 to 50, from 0.2 to 25, from 0.2 to 10, from 0.2 to 2, at least 0.6, from 0.6 to 100, from 0.6 to 75, from 0.6 to 50, from 0.6 to 25, from 0.6 to 10, from 0.6 to 5, from 0.6 to 2, from 0.9 to 100, from 0.9 to 75, from 0.9 to 50, from 0.9 to 40, from 0.9 to 25, from 0.9 to 10, from 0.9 to 5, from 0.9 to 2, or any subset thereof. The mesoporous pore volume and the microporous pore volume may be calculated from the nitrogen adsorption isotherm using the standard BJH method.

The cracking catalyst 202 may have a mesoporous surface area of at least 175 $m^2/g$. In embodiments, the cracking catalyst 202 may have a mesoporous surface area of at least 200 $m^2/g$, at least 225 $m^2/g$, from 175 $m^2/g$ to 1000 $m^2/g$, from 175 $m^2/g$ to 600 $m^2/g$, from 200 $m^2/g$ to 1000 $m^2/g$, from 200 $m^2/g$ to 600 $m^2/g$, from 200 $m^2/g$ to 400 $m^2/g$, from 225 $m^2/g$ to 1000 $m^2/g$, from 225 $m^2/g$ to 500 $m^2/g$, from 225 $m^2/g$ to 400 $m^2/g$, from 240 $m^2/g$ to 330 $m^2/g$, or any subset thereof. The mesoporous surface area may be calculated using the standard Brunauer-Emmett-Teller ("BET") method.

According to some embodiments, the at least one zeolite particle 20/8 may comprise a Beta zeolite, a Y-zeolite, or Beta zeolite and Y-zeolite; and the cracking catalyst 202 may have a mesoporous surface area of at least 240 $m^2/g$, such as from 240 $m^2/g$ to 1000 $m^2/g$, from 240 $m^2/g$ to 600 $m^2/g$, from 240 $m^2/g$ to 400 $m^2/g$, from 240 $m^2/g$ to 330 $m^2/g$, or any subset thereof. The mesoporous surface area may be calculated using the standard BET method.

The cracking catalyst 202 may have may have a surface area of at least 500 $m^2/g$, as determined by the BET method. In embodiments, the cracking catalyst 202 may have a surface area of at least 525 $m^2/g$, at least 550 $m^2/g$, at least 575 $m^2/g$, at least 600 $m^2/g$, at least 625 $m^2/g$, at least 635 $m^2/g$, from 500 $m^2/g$ to 1000 $m^2/g$, from 500 $m^2/g$ to 700 $m^2/g$, or any subset thereof, as determined by the BET method.

The cracking catalyst 202 may have an average particle size of from 216 nm to 360 nm. In embodiments, the cracking catalyst 202 may have an average particle size of from 216 nm to 325 nm, from 216 nm to 300 nm, from 216 nm to 275 nm, from 216 nm to 250 nm, from 225 nm to 360 nm, from 250 nm to 360 nm, from 275 nm to 360 nm, from 300 nm to 360 nm, from 316 nm to 360 nm, from 225 nm to 350 nm, from 250 nm to 325 nm, from 275 nm to 300 nm, or any subset thereof.

The cracking catalyst may comprise less than 0.1 wt. % of metals, other than silicon and aluminum, based on the total weight of the cracking catalyst. In embodiments, the cracking catalyst may comprise less than 0.01 wt. %, less than 0.001 wt. %, or even less than 0.0000001 wt. % of metals, other than silicon and aluminum, based on the total weight of the cracking catalyst. The metals other can silicon and aluminum may include alkali metals, alkaline earth metals, transition metals, lanthanides, precious metals, and actinides. In further embodiments, the metals other than silicon and aluminum may include Ag, Au, Ce, Co, Cu, Fc, Ir, La, Mg, Mn, Mo, Ni, Os, Pd, Pt, Rh, Ru, Sn, Ti, V, Zn, and Zr. The metals other than silicon and aluminum may include the metals in their oxide form, metallic form, or both.

Referring again to FIG. 1, the cracked effluent 140 may pass out of the steam catalytic cracking reactor 130. The cracked effluent 140 may include one or more products and intermediates, such as but not limited to light hydrocarbon gases, light olefins, aromatic compounds, pyrolysis oil, or combinations of these. The light olefins in the cracked effluent 140 may include ethylene, propylene, butenes, or combinations of these.

The contacting the hydrocarbon feed with the steam and the cracking catalyst under steam enhanced catalytic cracking conditions may cause the hydrocarbon feed to be converted to other products, such as light olefins ($C_2$ to $C_4$ olefins), $C_6$ to $C_{10}$ aromatic compounds, saturated $C_2$-$C_4$ hydrocarbons, fuel gas, and coke. In embodiments, the contacting the hydrocarbon feed with the steam and the cracking catalyst under steam enhanced catalytic cracking conditions may cause at least 60 wt. %, such as at least 61 wt. %, at least 62 wt. %, at least 63 wt. %, at least 64 wt. %, at least 65 wt. %, at least 66 wt. %, at least 67 wt. %, or even at least 68 wt. % of the hydrocarbon feed to be converted to other products, based on the total weight of the hydrocarbon feed.

The cracked effluent may comprise at least 40 wt. % of light olefins, based on the total weight of the hydrocarbons in the cracked effluent. In embodiments, the cracked effluent may comprise at least 41 wt. %, at least 42 wt. %, at least 43 wt. %, or at least 44 wt. % light olefins based on the total weight of the hydrocarbons in the cracked effluent. In embodiments, the cracked effluent may comprise from 40 wt. % to 60 wt. %, from 42 wt. % to 60 wt. %, from 44 wt. % to 60 wt. %, from 40 wt. % to 50 wt. %, from 42 wt. % to 50 wt. %, from 44 wt. % to 50 wt. %, from 40 wt. % to 47 wt. %, from 42 wt. % to 47 wt. %, from 44 wt. % to 47 wt. %, or any subset thereof, of light olefins, based on the total weight of hydrocarbons in the cracked effluent.

The cracked effluent may comprise ethylene. In embodiments, the cracked effluent may comprise at least 15 wt. % of ethylene, such as at least 16 wt. % ethylene based on the total weight of hydrocarbons in the cracked effluent. In embodiments, the cracked effluent may comprise from 15 wt. % to 30 wt. %, from 15 wt. % to 27.5 wt. %, from 15 wt. % to 25 wt. %, from 15 wt. % to 22.5 wt. %, from 15 wt. % to 20 wt. %, from 15 wt. % to 19 wt. %, from 16 wt. % to 30 wt. %, from 16 wt. % to 25 wt. %, from 16 wt. % to 20 wt. %, from 16 wt. % to 19 wt. %, from 16 wt. % to 18 wt. %, or any subset thereof, of ethylene, based on the total weight of hydrocarbons in the cracked effluent.

The cracked effluent may comprise propylene. In embodiments, the cracked effluent may comprise at least 10 wt. % of propylene, such as at least 12.5 wt. %, or at least 15 wt. % propylene based on the total weight of hydrocarbons in the cracked effluent. In embodiments, the cracked effluent may comprise from 10 wt. % to 30 wt. %, from 10 wt. % to 25 wt. %, from 10 wt. % to 20 wt. %, from 12.5 wt. % to 30 wt. %, from 12.5 wt. % to 25 wt. %, from 12.5 wt. % to 20 wt. %, from 14.8 wt. % to 30 wt. %, from 14.8 wt. % to 25 wt. %, from 14.8 wt. % to 20 wt. %, from 14.8 wt. % to 19 wt. %, from 14.8 wt. % to 18 wt. % propylene, based on the total weight of hydrocarbons in the cracked effluent.

The cracked effluent may comprise butenes. In embodiments, the cracked effluent may comprise at least 7 wt. % of butenes, such as at least 8 wt. %, at least 10 wt. %, at least 11 wt. % butenes, based on the total weight of hydrocarbons in the cracked effluent. In embodiments, the cracked effluent may comprise from 7 wt. % to 30 wt. %, from 7 wt. % to 25 wt. %, from 7 wt. % to 20 wt. %, from 7 wt. % to 15 wt. %, from 7 wt. % to 12.5 wt. %, from 10 wt. % to 30 wt. %, from 10 wt. % to 25 wt. %, from 10 wt. % to 20 wt. %, from 10 wt. % to 15 wt. %, from 11 wt. % to 30 wt. %, from 11 wt. % to 20 wt. %, from 11 wt. % to 15 wt. %, or from 11 wt. % to 12.5 wt. % butenes, based on the total weight of hydrocarbons in the cracked effluent.

The cracked effluent may comprise $C_6$ to $C_{10}$ aromatic compounds, such as those making up the naphtha fraction of the cracked effluent. In embodiments, the cracked effluent may comprise at least 15 wt. % or at least 20 wt. % $C_6$ to $C_{10}$ aromatic compounds, based on the total weight of hydrocarbons in the cracked effluent. In embodiments, the cracked effluent may comprise from 15 wt. % to 40 wt. %, from 15 wt. % to 30 wt. %, from 20 wt. % to 40 wt. %, from 20 wt. % to 30 wt. %, from 21 wt. % to 28 wt. %, from 25 wt. % to 28 wt. %, or any subset thereof, of $C_6$ to $C_{10}$ aromatic compounds, based on the total weight of hydrocarbons in the cracked effluent.

The contacting the hydrocarbon feed with the steam and the cracking catalyst under steam enhanced catalytic cracking conditions may cause some of portion of the hydrocarbon feed to be converted to coke. In embodiments, the contacting the hydrocarbon feed with steam and the cracking catalyst under steam enhanced catalytic cracking conditions may cause less than 8 wt. % or less than or equal to 7 wt. % of the hydrocarbon feed to be converted to coke, based on the total weight of the hydrocarbon feed. In embodiments, the contacting the hydrocarbon feed with steam and the cracking catalyst under steam enhanced catalytic cracking conditions may cause from 4 wt. % to 7 wt. %, from 5 wt. % to 7 wt. %, from 5.5 wt. % to 7 wt. %, or any subset thereof, of the hydrocarbon feed to be converted to coke, based on the total weight of the hydrocarbon feed.

It should be understood that at least a portion of any coke produced may be deposited on the cracking catalyst, such as being adhered to the cracking catalyst. Further, at least a portion of the coke on the cracking catalyst may be removed during the regeneration cycle, such as through combustion of the coke in the regenerator.

Referring again to FIG. 1, the steam catalytic cracking system 110 may further include a cracking effluent separation system 150 disposed downstream of the steam catalytic cracking reactors 130. When the steam catalytic cracking system 110 includes a plurality of steam catalytic cracking reactors 130, the steam catalytic cracking effluents 140 from each of the steam catalytic cracking reactors 130 may be passed to a single shared cracking effluent separation system 150. In embodiments, each steam catalytic cracking reactor 130 may have its own dedicated cracking effluent separation system 130. The steam catalytic cracking effluent 140 may be passed from the steam catalytic cracking reactor 130 directly to the cracking effluent separation system 150. The cracking effluent separation system 150 may separate the steam catalytic cracking effluent 140 into one or more than one cracking product effluents, which may be liquid or gaseous product effluents.

Referring again to FIG. 1, the cracking effluent separation system 150 may include one or a plurality of separation units. Separation units may include but are not limited to distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation units may include one or more gas-liquid separators, one or more liquid-liquid separators, or a combination of these.

In embodiments, the cracking effluent separation system 150 may include a gas-liquid separation unit 160 and a centrifuge unit 170 downstream of the gas-liquid separation unit 160. The gas-liquid separation unit 160 may operate to separate the steam catalytic cracking effluent 140 into a liquid effluent 162 and a gaseous effluent 164. The gas-liquid separation unit 160 may operate to reduce the temperature of the steam catalytic cracking effluent 140 to condense constituents of the steam catalytic cracking effluent 140 having greater than or equal to 5 carbon atoms. The gas-liquid separation unit 160 may operate at a temperature of from 10° C. to 15° C. to ensure that normal pentane and constituents with boiling point temperatures greater than normal pentane are condensed into the liquid effluent 162. The liquid effluent 162 may include distillation fractions such as naphtha, kerosene, gas oil, vacuum gas oil; unconverted feedstock; residue; water; or combinations of these. The liquid effluent 162 may include the light aromatic compounds produced in the steam catalytic cracking reactor 130, which light aromatic compounds may include but are not limited to benzene, toluene, mixed xylenes, ethylbenzene, and other light aromatic compounds. The liquid effluent 162 may include at least 95%, at least 98%, at least 99%, or even at least 99.5% of the hydrocarbon constituents of the steam catalytic cracking effluent 140 having greater than or equal to 5 carbon atoms. The liquid effluent 162 may include at least 95%, at least 98%, at least 99%, or even at least 99.5% of the water from of the steam catalytic cracking effluent 140.

The gaseous effluent 164 may include olefins, such as ethylene, propylene, butenes, or combinations of these; light hydrocarbon gases, such as methane, ethane, propane, n-butane, i-butane, or combinations of these; other gases, such as but not limited to hydrogen; or combinations of these. The gaseous effluent 164 may include the $C_2$-$C_4$ olefin products, such as but not limited to, ethylene, propylene, butenes (1-butene, cis-2-butene, trans-2-butene, isobutene, or combinations of these), or combinations of these, produced in the steam catalytic cracking reactor 130. The gaseous effluent 164 may include at least 90%, at least 95%, at least 98%, at least 99%, or at least 99.5% of the $C_2$-$C_4$ olefins from the steam catalytic cracking effluent 140. The gaseous effluent 164 may be passed to a downstream gas separation system (not shown) for further separation of the gaseous effluent 164 into various product streams, such as but not limited to one or more olefin product streams.

In embodiments, the liquid effluent 162, which includes the water and hydrocarbon having greater than 5 carbon atoms, may be passed to the in-line centrifuge unit 170. The in-line centrifuge unit 170 may operate to separate the liquid effluent 162 into a liquid hydrocarbon effluent 172 and an aqueous effluent 174. The in-line centrifuge unit 170 may be operated at a rotational speed of from 2500 rpm to 5000 rpm, from 2500 rpm to 4500 rpm, from 2500 rpm to 4000 rpm, from 3000 rpm to 5000 rpm, from 3000 rpm to 4500 rpm, or from 3000 rpm to 4000 rpm to separate the hydrocarbon phase from the aqueous phase.

The liquid hydrocarbon effluent 172 may include hydrocarbons from the steam catalytic cracking effluent 140 having greater than or equal to 5 carbon atoms. The liquid hydrocarbon effluent 172 may include the light aromatic compounds produced in the steam catalytic cracking reactor 130, which light aromatic compounds may include but are not limited to benzene, toluene, mixed xylenes, ethylbenzene, and other light aromatic compounds. The liquid hydrocarbon effluent 172 may further include naphtha, kerosene, diesel, vacuum gas oil (VGO), or combinations of these. The liquid hydrocarbon effluent 172 may include at 90%, at least 95%, at least 98%, at least 99%, or even at least 99.5% of the hydrocarbon constituents from the liquid effluent 162. The liquid hydrocarbon effluent 172 may be passed to a downstream treatment processes for further conversion or separation. At least a portion of the liquid hydrocarbon effluent 172 may be passed back to the steam catalytic cracking reactor 130 for further conversion to olefins. The aqueous effluent 174 may include water and water soluble constituents from the liquid effluent 162. The aqueous effluent 174 may include some dissolved hydrocarbons soluble in the aqueous phase of the liquid effluent 162. The aqueous effluent 174 may include at least 95%, at least 98%, at least 99%, or even at least 99.5% of the water from the liquid effluent 162. The aqueous effluent 174 may be passed to one or more downstream processes for further treatment. In embodiments, at least a portion of the aqueous effluent 174 may be passed back to the steam catalytic cracking reactor 130 as at least a portion of the water 120 introduced to the steam catalytic cracking reactor 130.

In embodiments, the cracking catalysts of the present disclosure may be used as at least a portion of an FCC catalyst composition for a fluidized catalytic cracking (FCC) reactor. The FCC reactor may be a fluidized bed reactor. In the FCC reactor, the cracking catalyst may be contacted with the hydrocarbon feed, such as crude oil, in the presence of steam to produce light olefins, light aromatic compounds, or combinations of these. Suitable FCC processes for catalytically cracking crude oil in the presence of steam are disclosed in U.S. patent application Ser. No. 17/009,008, U.S. patent application Ser. No. 17/009,012, U.S. patent application Ser. No. 17/009,020, U.S. patent application Ser. No. 17/009,022, U.S. patent application Ser. No. 17/009,039, U.S. patent application Ser. No. 17/009,048, and U.S. patent application Ser. No. 17/009,073, all of which are incorporated by reference in their entireties in the present disclosure. The hydrocarbon feed can be any of the hydrocarbon feeds previously discussed in the present disclosure. The FCC reactor may be an upflow or a downflow FCC reactor. The FCC reactor system can include one or a plurality of FCC reactors, with one or a plurality of catalyst regenerators.

In embodiments, the FCC reactor may be operated at a reaction temperature of at least about 500° C., such as a reaction temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C. Steam may be injected to the FCC reactor. The hydrocarbon feed may be catalytically cracked in the presence of the steam with the cracking catalyst. The steam to the hydrocarbon mass ratio in the FCC reactor may be from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all water in the FCC reactor. In embodiments, the residence time of the hydrocarbon feed and the steam in contact with the cracking catalyst in the FCC reactor may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds. In embodiments, the cracking catalyst to hydrocarbon (catalyst to oil) weight ratio in the FCC reactor may be from 3 to 40, such as from 3 to 30, from 3 to 20, from 5 to 40, from 5 to 30, from 5 to 20, from 5 to 10, from 7 to 40, from 7 to 30, 7 to 20, from 7 to 10, from 10 to 40, from 10 to 30, from 10 to 20, or from 20 to 40. The cracking effluent from the FCC reactor can be separated into various product streams, intermediate streams, and an aqueous stream in a separation system downstream of the FCC reactor.

The cracking catalyst 202 of the present disclosure may be formed by a surfactant-directed sol-gel coating process. Specifically, the cracking catalyst 202 may be formed by a process comprising preparing a zeolite solution comprising a plurality of zeolite particles, a templating agent, and one or more solvents; introducing a silica source to the zeolite solution to form a zeolite-silica solution; crystallizing the zeolite-silica solution to form a plurality of core-shell composite particles; separating the plurality of core-shell composite particles; and calcining the plurality of core-shell composite particles to form the cracking catalyst. The surfactant-directed sol-gel coating process may further comprise introducing an alumina source to the zeolite solution or the zeolite-silica solution. In embodiments, the alumina source may comprise aluminum sulfate.

The templating agent may comprise cetrimonium bromide, trimethyltetradecylammonium bromide, tetrabutylammonium bromide, cetylpyridinium bromide (CPB), or cetyltrimethylammonium bromide (CTAB). In embodiments, the templating agent may comprise an ammonium templating agent, such as CTAB.

The one or more solvents may comprise water, alcohol, ammonia, or combinations of these. In embodiments, the one or more solvents may comprise water, alcohol, and ammonia. In embodiments, the alcohol may comprise methanol, ethanol, propanol (such as iso-propanol or n-propanol), butanol (such as 1-butanol), pentanol (such as 1-pentanol), or combinations of these.

The silica source may comprise tetraethylorthosilicate (TEOS), tetramethyl orthosilicate (TMOS), sodium silicate ($Na_2SiO_3$), or a combination of these silica sources. In embodiments, the silica source may comprise TEOS.

A weight ratio of the silica source to the plurality of zeolite particles may be from 0.85 to 1.70, based on the total weight of the silica source and the plurality of zeolite particles. In embodiments, the weight ratio of the silica source to the plurality of zeolite particles may be from 0.85 to 1.6, from 0.85 to 1.5, from 0.85 to 1.4, from 0.85 to 1.3, from 0.85 to 1.2, from 0.85 to 1.1, from 0.85 to 1.0, from 0.9 to 1.7, from 1.0 to 1.7, from 1.1 to 1.7, from 1.2 to 1.7, from 1.3 to 1.7, from 1.4 to 1.7, from 1.5 to 1.7, from 1.6 to 1.7, or any subset thereof, based on the total weight of the silica source and the plurality of zeolite particles.

A molar ratio of the silica source to the alumina source may be from 0 to 500. In embodiments, the molar ratio of the silica source to the alumina source may be from 0 to 400, from 0 to 200, from 0 to 100, from 0 to 75, from 0 to 25, from 0 to 1, from 10 to 500, from 10 to 400, from 10 to 300, from 10 to 200, from 10 to 100, from 10 to 50, from 5 to 16, from 5 to 14, from 5 to 12, from 5 to 10, from 5 to 8, from 5 to 6, from 7 to 16, from 9 to 16, from 11 to 16, from 13 to 16, from 15 to 16, from 7 to 13, from 9 to 11, or any subset thereof.

The crystallizing step may comprise stirring the zeolite-silica solution at from 20° C. to 30° C. for from 3 hours to 10 hours. In embodiments, the crystallizing step may comprise stirring the zeolite-silica solution at from 22.5° C. to 27.5° C. for from 3 hours to 8 hours, from 3 hours to 6 hours, from 3 hours to 5 hours, or any subset thereof.

Separating the plurality of core-shell composite particles may comprise centrifuging the zeolite-silica solution comprising the plurality of core-shell composite particles. In embodiments, separating the plurality of core-shell composite particles may comprise centrifuging the zeolite-silica solution comprising the plurality of core-shell composite particles at a rotational speed of at least 2,000 rpm, at least 4,000 rpm, at least 8,000 rpm, at least 10,000 rpm, at least 20,000 rpm, at least 30,000 rpm, at least 40,000 rpm, from 2,000 rpm to 80,000 rpm, from 4,000 rpm to 80,000 rpm, from 8,000 rpm to 80,000 rpm, from 10,000 rpm to 80,000 rpm, from 20,000 rpm to 80,000 rpm, from 30,000 rpm to 80.000 rpm, or any subset thereof.

Calcining the plurality of core-shell composite particles may comprise exposing the plurality of core-shell composite particles to a temperature of from 500° C. to 800° C. and air, for a calcining time of from 3 to 24 hours. In embodiments, calcining the plurality of core-shell composite particles may comprise exposing the plurality of core-shell composite particles to a temperature of from 500° C. to 700° C., from 500° C. to 600° C., from 525° C. to 575° C. and air, for a calcining time of from 3 hours to 10 hours, from 3 hours to 9 hours, from 5 hours to 10 hours, from 7 hours to 10 hours, from 7 hours to 9 hours, or any subset thereof. Calcining the plurality of core-shell composite particles may convert the plurality of core shell particles to a zeolite in hydrogen form.

According to a first aspect of the present disclosure, a process for converting a hydrocarbon feed may comprise contacting a hydrocarbon feed with steam in the presence of a cracking catalyst under steam enhanced catalytic cracking conditions, where the cracking catalyst comprises a nanoparticle and the contacting the hydrocarbon feed with the steam in the presence of the cracking catalyst causes at least a portion of the hydrocarbon feed to undergo steam catalytic cracking reactions to produce a cracked effluent comprising $C_2$ to $C_4$ olefins, $C_6$ to $C_{10}$ aromatic compounds, or both. The nanoparticle may comprise a core and a shell. The shell may be mesoporous and comprise silica ($SiO_2$), alumina ($Al_2O_3$), or silica and alumina. The core may comprise at least one zeolite particle and the at least one zeolite particle may comprise ZSM-5 zeolites, Beta zeolites, Y-zeolites, or combinations of these zeolites.

According to a second aspect of the present disclosure, in conjunction with the first aspect, the at least one zeolite particle may comprise a Beta zeolite, a Y-zeolite, or Beta zeolite and Y-zeolite.

According to a third aspect of the present disclosure, in conjunction with either one of the first or second aspects, the at least one zeolite particle may have an average particle size of from 200 nm to 300 nm.

According to a fourth aspect of the present disclosure, in conjunction with any one of aspects 1-3, the at least one zeolite particle may have a molar ratio of silica to alumina of from 23 to 500.

According to a fifth aspect of the present disclosure, in conjunction with any one of aspects 1-4, the at least one zeolite particle may have a molar ratio of silica to alumina of from 23 to 80.

According to a sixth aspect of the present disclosure, in conjunction with any one of aspects 1-5, the core may comprise a single zeolite particle.

According to a seventh aspect of the present disclosure, in conjunction with any one of aspects 1-6, the core may consist of a single zeolite particle and optionally silica and alumina.

According to an eighth aspect of the present disclosure, in conjunction with any one of aspects 1-7, the shell may have a thickness of from 8 nm to 26 nm.

According to a ninth aspect of the present disclosure, in conjunction with any one of aspects 1-8, the shell may comprise silica and alumina and have a molar ratio of silica to alumina of from 10 to 50.

According to a tenth aspect of the present disclosure, in conjunction with any one of aspects 1-9, the shell may have an average pore diameter of from 2 nm to 50 nm.

According to an eleventh aspect of the present disclosure, in conjunction with any one of aspects 1-10, the cracking catalyst may have a mesoporous pore volume of at least 0.020 $cm^3/g$.

According to a twelfth aspect of the present disclosure, in conjunction with any one of aspects 1-11, the cracking catalyst may have a volume ratio of mesopores to micropores of at least 0.6.

According to a thirteenth aspect of the present disclosure, in conjunction with any one of aspects 1-12, the cracking catalyst may have a mesoporous surface area of at least 175 $m^2/g$.

According to a fourteenth aspect of the present disclosure, in conjunction with any one of aspects 1-13, the cracking catalyst has an average diameter of from 216 nm to 360 nm.

According to a fifteenth aspect of the present disclosure, in conjunction with any one of aspects 1-14, the cracking catalyst may comprise less than 0.1 wt. % of metals other than silicon and aluminum, based on the total weight of the cracking catalyst.

According to a sixteenth aspect of the present disclosure, in conjunction with any one of aspects 1-15, the contacting may further comprise contacting the hydrocarbon feed with the steam in the presence of the cracking catalyst at a weighted average bed temperature (WABT) of from 100° C. to 700° C., a steam to hydrocarbon feed mass ratio of from 0.2 to 0.8, or both.

According to a seventeenth aspect of the present disclosure, in conjunction with any one of aspects 1-16, the hydrocarbon feed may be a whole crude with an API gravity of from 25 to 52 and a sulfur content of from 0.05 wt. % to 3 wt. %, based on the total weight of the hydrocarbon feed.

According to an eighteenth aspect of the present disclosure, in conjunction with any one of aspects 1-17, the contacting the hydrocarbon feed with the steam and the cracking catalyst under steam enhanced catalytic cracking conditions may cause less than 6 wt. % of the hydrocarbon feed to be converted to coke, based on the total weight of the hydrocarbon feed.

According to a nineteenth aspect of the present disclosure, in conjunction with any one of aspects 1-18, the cracked effluent may comprise $C_2$ to $C_4$ olefins.

According to a twentieth aspect of the present disclosure, in conjunction with any one of aspects 1-19, the cracked effluent may comprise at least 40 wt. % of $C_2$ to $C_4$ olefins, based on the total weight of the hydrocarbons in the cracked effluent.

According to a twenty-first aspect of the present disclosure, in conjunction with any one of aspects 1-20, the cracked effluent may comprise at least 8 wt. % of butenes, based on the total weight of hydrocarbons in the cracked effluent.

According to a twenty-second aspect of the present disclosure, in conjunction with any one of aspects 1-21, at least 20 wt. % of $C_2$ to $C_4$ olefins in the cracked effluent may be butenes, based on the total weight of light olefins in the cracked effluent.

According to a twenty-third aspect of the present disclosure, in conjunction with any one of aspects 1-22, the cracked effluent may comprise at least 22 wt. % of naphtha, based on the total weight of hydrocarbons in the cracked effluent.

According to a twenty-fourth aspect of the present disclosure, in conjunction with any one of aspects 1-22, the at least one zeolite particle may be selected from Beta zeolites and Y-zeolites, the at least one zeolite particle may have a molar ratio of silica to alumina of from 23 to 80, the shell may have a thickness of from 8 nm to 26 nm, the shell may comprise silica and alumina, the shell may have a molar ratio of silica to alumina of from 10 to 50, the shell may have an average pore diameter of from 2 nm to 50 nm, the cracking catalyst may have a mesoporous pore volume of at least 0.020 $cm^3/g$, the cracking catalyst may have a volume ratio of mesopores to micropores of at least 0.6, the cracking catalyst may have a mesoporous surface area of at least 175 $m^2/g$, the cracking catalyst may have an average diameter of from 216 nm to 360 nm, the cracking catalyst may comprise less than 0.1 wt. % of metals other than silicon and aluminum, based on the total weight of the cracking catalyst, the hydrocarbon feed may be a whole crude with an API gravity of from 25 to 52 and a sulfur content of from 0.05 wt. % to 3 wt. %, based on the total weight of the hydrocarbon feed, the contacting may further comprise contacting the hydrocarbon feed with the steam in the presence of the cracking catalyst at a weighted average bed temperature (WABT) of from 100° C. to 700° C., a steam to hydrocarbon feed mass ratio of from 0.2 to 0.8, or both, the cracked effluent may comprise at least 40 wt. % of $C_2$ to $C_4$ olefins, based on the total weight of the hydrocarbons in the cracked effluent, the cracked effluent may comprise at least 8 wt. % of butenes, based on the total weight of hydrocarbons in the cracked effluent, and at least 20 wt. % of $C_2$ to $C_4$ olefins in the cracked effluent may be butenes, based on the total weight of light olefins in the cracked effluent.

EXAMPLES

The various aspects of the present disclosure will be further clarified by the following examples. The examples are illustrative in nature and should not be understood to limit the subject matter of the present disclosure.

Comparative Examples A, B, C, D, E, and F

A series of comparative examples were provided. Comparative Examples CE. A, C, D, and E were commercial, microporous zeolites, as described in Table 3. Comparative Examples CE. B and CE. F were mesoporous core-shell catalysts with a silica shell (no alumina was included).

TABLE 3

| Sample | TEOS/ Zeolite (wt. ratio) | Zeolite | SAR | Model | Supplier |
|---|---|---|---|---|---|
| CE. A | N/A | ZSM-5 | 30 | CBV3024E | Zeolyst International |
| CE. B | 0.85 | ZSM-5 | 30 | CBV3024E | Zeolyst International |
| CE. C | N/A | ZSM-5 | 80 | CBV8014 | Zeolyst International |
| CE. D | N/A | USY | 500 | HSZ-390-HUA | Tosoh USA, Inc. |
| CE. E | N/A | Beta | 38 | CP814C | Zeolyst International |
| CE. F | 0.85 | ZSM-5 | 80 | CBV8014 | Zeolyst International |

Preparation of Cracking Catalysts 1-9

The cracking catalysts of the present disclosure were prepared through a surfactant-directed sol-gel coating process. The resultant cracking catalysts had a microporous zeolite core and a mesoporous silica-alumina shell.

The cracking catalysts were prepared by dispersing 5 g of various zeolite particles (as described in Table 4) in a mixture of 3.5 g cetrimonium bromide (CTAB), 200 mL water, 90 mL ethanol and 13.7 mL ammonia solution. The dispersion was stirred at ambient temperature for 30 min. Then, TEOS and $Al_2(SO_4)_3 \cdot 18\ H_2O$ were added slowly until the TEOS to zeolite wt. ratios and TEOS to $Al_2(SO_4)_3 \cdot 18\ H_2O$ wt. ratios reached the levels specified in Table 4. Then, the mixture was stirred for another 4 hr. at ambient temperature. The solid core-shell composites were isolated by centrifugation at 40,000 rpm, followed by washing with ethanol, then water, and then dried overnight in air at 80° C. Subsequently, the core-shell composites were calcined at 550° C. for 8 h (reaching the calcination temperature at a heating rate of 1° C. $min^{-1}$) in air atmosphere to obtain the cracking catalyst.

As mentioned above, the shell thickness was controlled by adjusting the TEOS to zeolite weight ratios between 0.85 and 1.7, while Al-content of mesoporous silica shells was controlled by varying TEOS to $Al_2(SO_4)_3 \cdot 18\ H_2O$ wt. ratios in the range of 5.0 to 15.86, as shown in Table 4.

TABLE 4

| Sample | TEOS to $Al_2(SO_4)_3$ (mole ratio) | TEOS to Zeolite (wt. ratio) | Zeolite | SAR | Model | Supplier |
|---|---|---|---|---|---|---|
| Ex. 1 | 15.86 | 0.85 | ZSM-5 | 30 | CBV3024E | Zeolyst International |
| Ex. 2 | 15.86 | 1.28 | ZSM-5 | 30 | CBV3024E | Zeolyst International |
| Ex. 3 | 15.86 | 1.70 | ZSM-5 | 30 | CBV3024E | Zeolyst International |
| Ex. 4 | 10.25 | 0.85 | ZSM-5 | 30 | CBV3024E | Zeolyst International |
| Ex. 5 | 5 | 0.85 | ZSM-5 | 30 | CBV3024E | Zeolyst International |
| Ex. 6 | 15.86 | 0.85 | ZSM-5 | 80 | CBV8014 | Zeolyst International |
| Ex. 7 | 15.86 | 0.85 | USY | 500 | HSZ-390-HUA | Tosoh USA, Inc. |
| Ex. 8 | 15.86 | 0.85 | Beta | 38 | CP814C | Zeolyst International |
| Ex. 9 | 15.86 | 0.85 | ZSM-5 | 23 | CBV2314 | Zeolyst International |

Catalyst Characterization

Brunauer-Emmett-Teller (BET) surface area and other textural properties were calculated from the nitrogen adsorption isotherms. These properties are described in detail in Table 5 below.

TABLE 5

| Sample | $S_{BET}$ [$m^2/g$] | $S_{micro}$ [$m^2/g$] | $S_{meso}$ [$m^2/g$] | $V_{Total}$ [$cm^3/g$] | $V_{micro}$ [$cm^3/g$] | $V_{meso}$ [$cm^3/g$] | $V_{meso}/V_{micro}$ | $D_{micro}$ [nm] |
|---|---|---|---|---|---|---|---|---|
| CE. A | 342 | 210 | 133 | 0.170 | 0.112 | 0.058 | 0.518 | 5.052 |
| CE. B | 534 | 90 | 444 | 0.309 | 0.040 | 0.269 | 6.725 | 2.842 |
| Ex. 1 | 518 | 92 | 426 | 0.379 | 0.040 | 0.339 | 8.475 | 3.521 |
| Ex. 2 | 582 | 36 | 546 | 0.424 | 0.012 | 0.412 | 34.333 | 3.285 |
| Ex. 3 | 591 | 16 | 576 | 0.357 | 0.008 | 0.349 | 43.625 | 2.752 |
| Ex. 4 | 486 | 99 | 387 | 0.328 | 0.047 | 0.281 | 5.979 | 3.490 |
| Ex. 5 | 447 | 94 | 353 | 0.261 | 0.049 | 0.212 | 4.327 | 3.240 |
| CE. C | 390 | 217 | 173 | 0.150 | 0.116 | 0.034 | 0.293 | 3.267 |
| Ex. 6 | 449 | 156 | 292 | 0.217 | 0.086 | 0.131 | 1.523 | 2.975 |
| CE. D | 568 | 482 | 86 | 0.267 | 0.253 | 0.014 | 0.055 | 10.325 |
| Ex. 7 | 637 | 312 | 325 | 0.324 | 0.166 | 0.159 | 0.957 | 3.923 |
| CE. E | 522 | 375 | 147 | 0.160 | 0.197 | −0.037 | 0.188 | 3.963 |
| Ex. 8 | 637 | 389 | 248 | 0.305 | 0.121 | 0.184 | 1.521 | 0.295 |

As can be seen in Table 5, the Comparative Examples CE. A, C, D, and E, which lacked a silica shell, had significantly lower mesoporous surface areas than any of Ex. 1-8. Additionally, Comparative Examples CE. A, C, D, and E had significantly lower ratios of the volume of mesopores to micropores than did any of Ex. 1-8.

Figure 3:
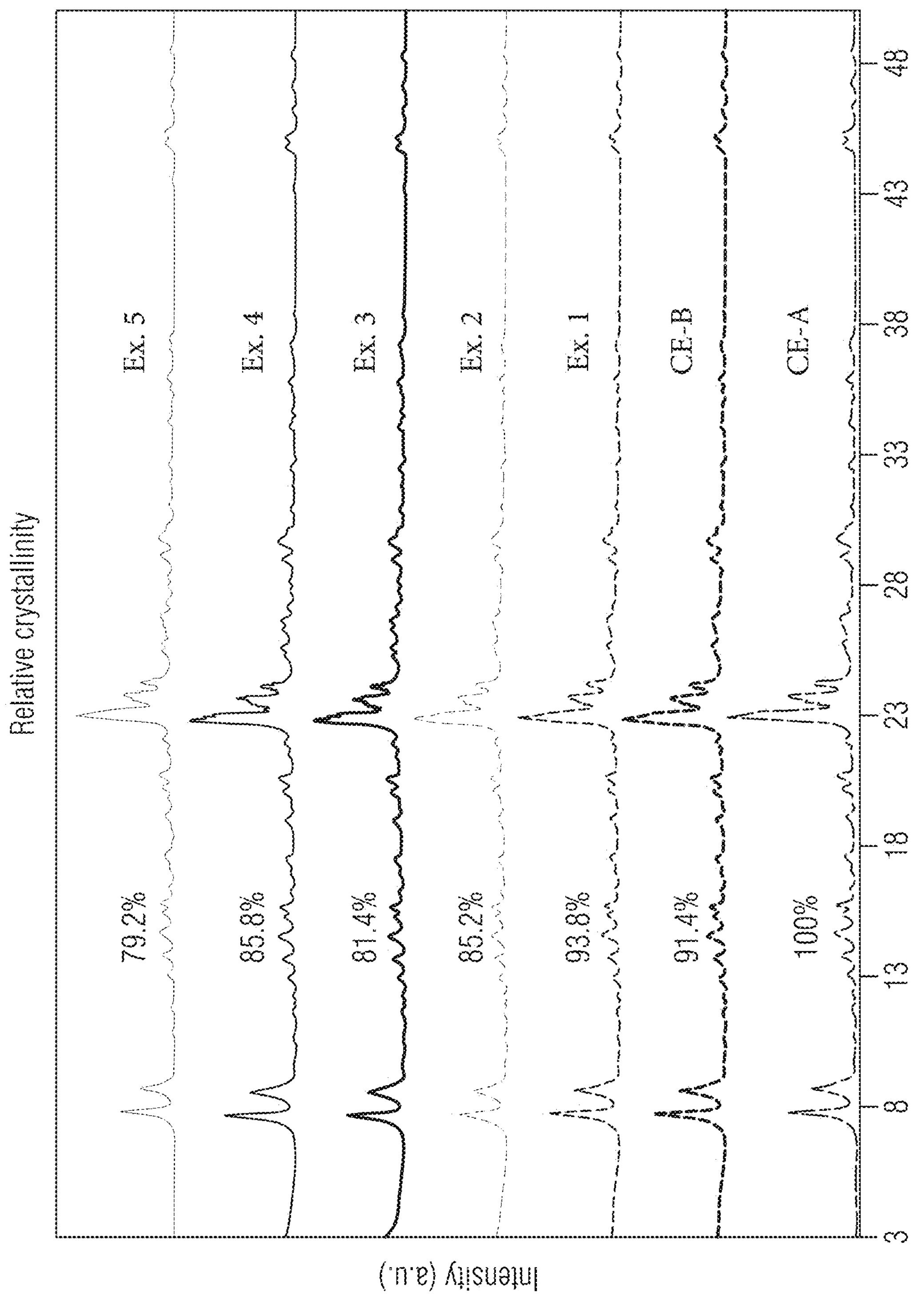
FIG. 3 graphically depicts X-ray diffraction (XRD) spectra for cracking catalysts, according to one or more embodiments shown and described in the present disclosure.

Referring now to FIG. 3, X-ray diffraction (XRD) was performed on zeolite CE. A (310), comparative composite catalyst CE. B (320), and cracking catalysts Ex. 1 (330), Ex. 2 (340), Ex. 3 (350), Ex. 4 (360), and Ex. 5 (370). Comparative crystallinities are shown in Table 6. The zeolite CE. A was used as a reference standard.

TABLE 6

| Sample | CE. A | CE. B | Ex. 1 | Ex. 2 | Ex. 3 | Ex. 4 | Ex. 5 |
|---|---|---|---|---|---|---|---|
| Crystallinity | 100% | 91.4% | 93.8% | 85.2% | 81.4% | 85.8% | 79.2% |

$NH_3$-temperature programmed desorption (TPD) was performed on zeolite CE. A, comparative composite catalyst CE. B, and cracking catalysts Ex. 1, Ex. 2, Ex. 3, Ex. 4, and Ex. 5. Results are given in Table 7.

TABLE 7

| | Amount of $NH_3$ desorbed (mmol/g) | | |
|---|---|---|---|
| Catalyst | 100-350° C. | Above 350° C. | Total |
| CE. A | 0.280 | 0.038 | 0.318 |
| CE. B | 0.184 | 0.024 | 0.208 |
| Ex. 1 | 0.164 | 0.032 | 0.196 |
| Ex. 2 | 0.167 | 0.019 | 0.186 |
| Ex. 3 | 0.182 | 0.025 | 0.207 |
| Ex. 4 | 0.187 | 0.028 | 0.215 |
| Ex. 5 | 0.175 | 0.035 | 0.210 |

The $NH_3$-TPD profiles for all catalysts exhibit two desorption peaks. One ascribed to the weak-medium acid sites within the temperature range of 100° C.-350° C. and one ascribed to the strong acid sites above 350° C.

Figure 4:
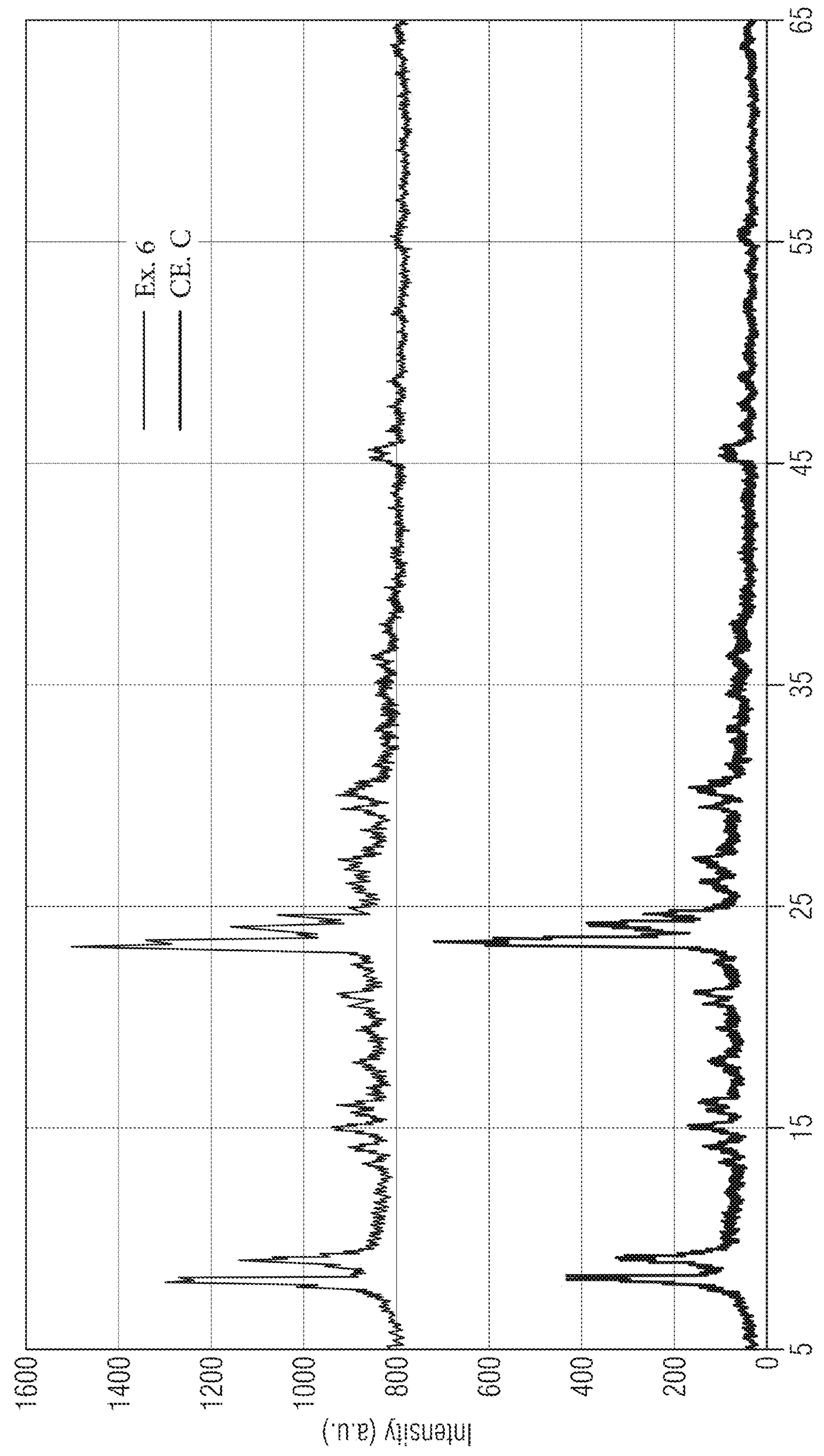
FIG. 4 graphically depicts XRD spectra for cracking catalysts, according to one or more embodiments shown and described in the present disclosure.
Figure 5:
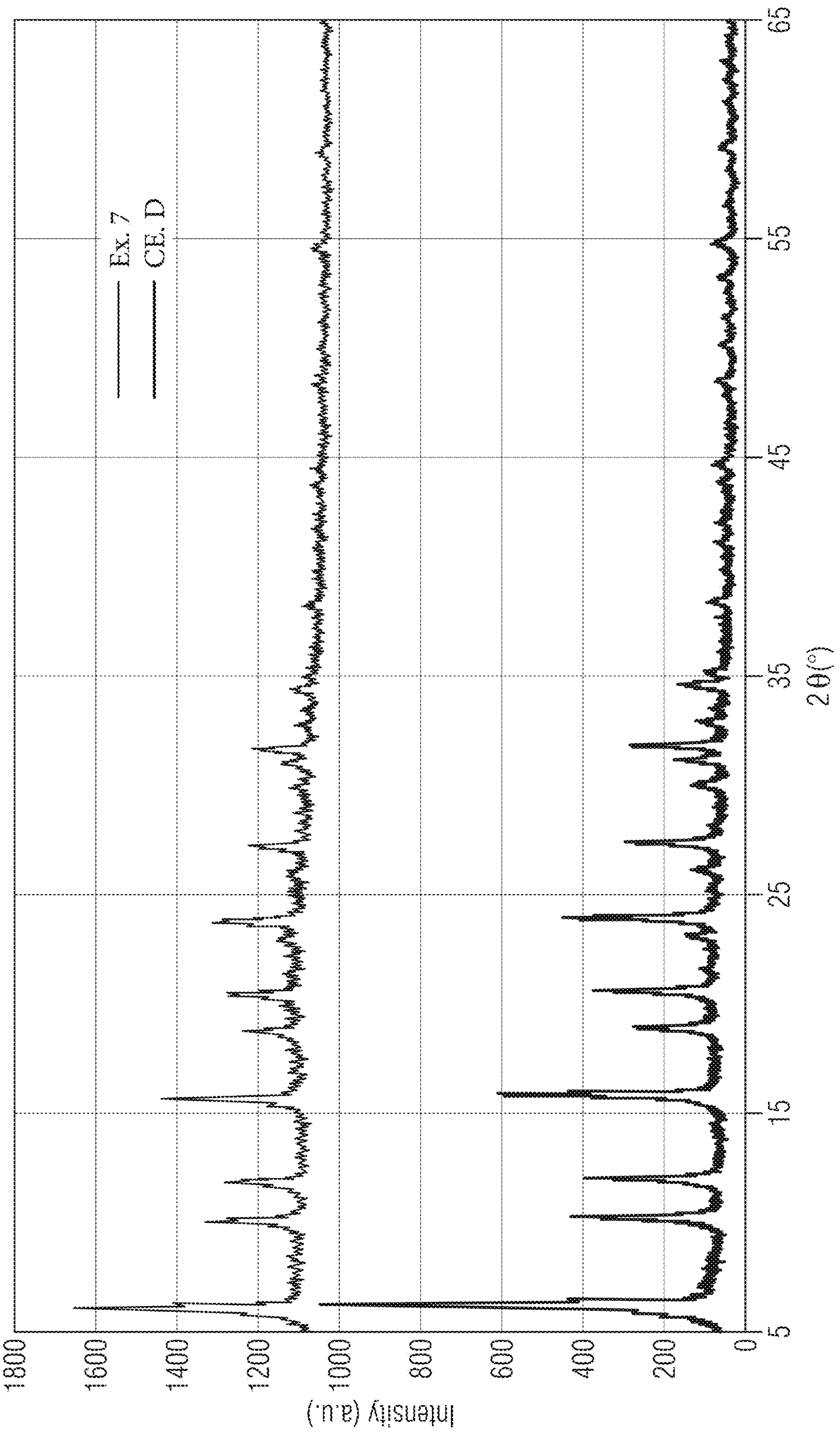
FIG. 5 graphically depicts XRD spectra for cracking catalysts, according to one or more embodiments shown and described in the present disclosure.
Figure 6:
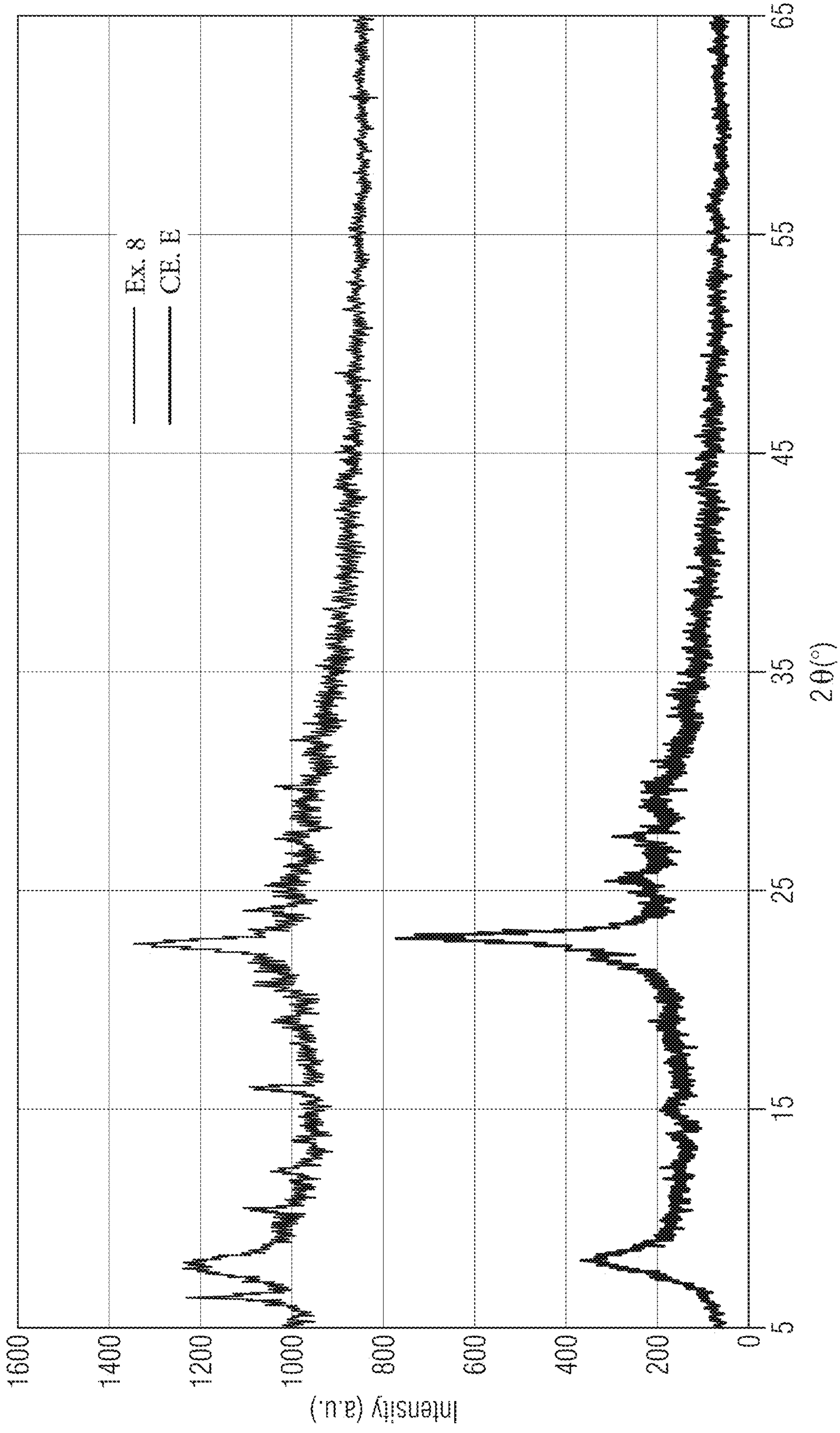
FIG. 6 graphically depicts XRD spectra for cracking catalysts, according to one or more embodiments shown and described in the present disclosure.

FIG. 4 shows XRD results of ZSM-5 zeolite CE. C (410) and cracking catalyst Ex. 6 (420). FIG. 5 shows XRD results of USY zeolite CE. D (510) and cracking catalyst Ex. 7 (520). FIG. 6 shows XRD results of Beta-zeolite CE. E (610) and cracking catalyst Ex. 8 (620).

The X-ray diffraction pattern of pristine zeolites (CE. C. CE. D, and CE. E) and the cracking catalysts (Ex. 6, Ex. 6, and Ex. 8) are almost identical. Notably, after coating with mesoporous silica and/or alumina, the XRD patterns of the composite maintained the pristine crystalline structure with no amorphous peak in the range $2\theta=20°-30°$. However, the relative crystallinity of the mesoporous core-shell composites decreases with the increase in shell thickness and Al-content, this implies that the coating process has an insignificant effect on the crystalline zeolitic structure. Additionally, this decrease in relative crystallinity correlated with shell thickness shows the shielding properties of mesoporous silica and/or silica-alumina shell.

Figure 7A:
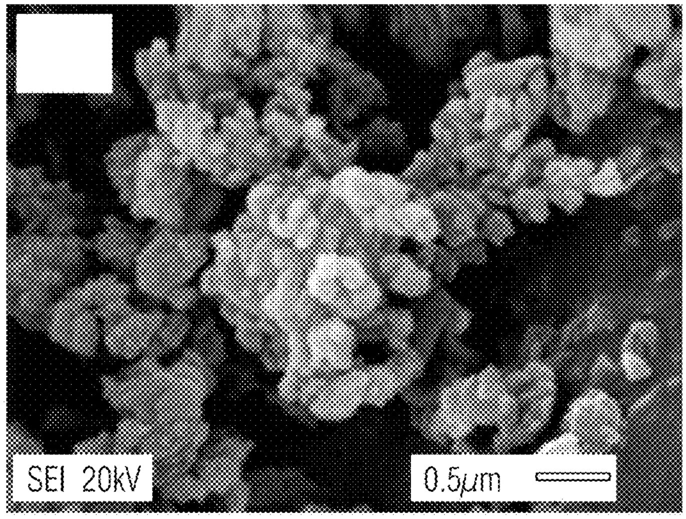
FIGS. 7(*a*), 7(*b*), and 7(*c*) are Scanning Electron Microscope (SEM) images of cracking catalysts, according to one or more embodiments shown and described in the present disclosure.
Figure 7B:
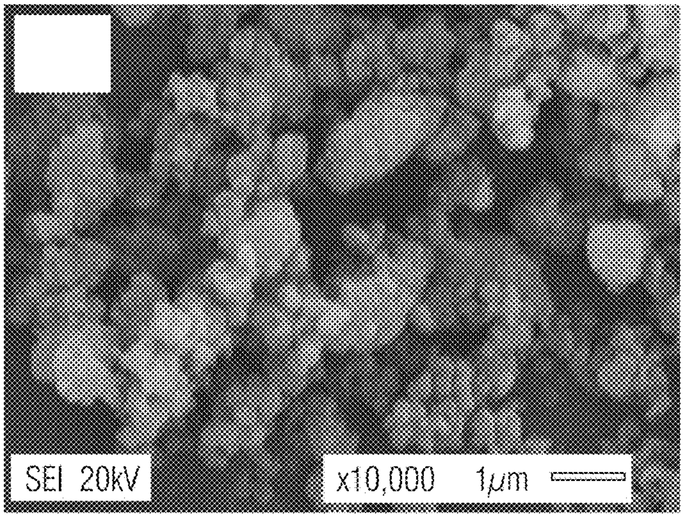
Figure 7C:
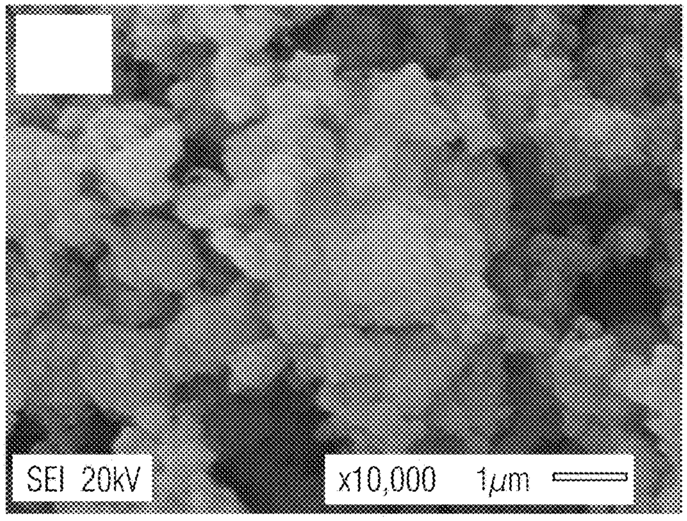
Figure 8A:
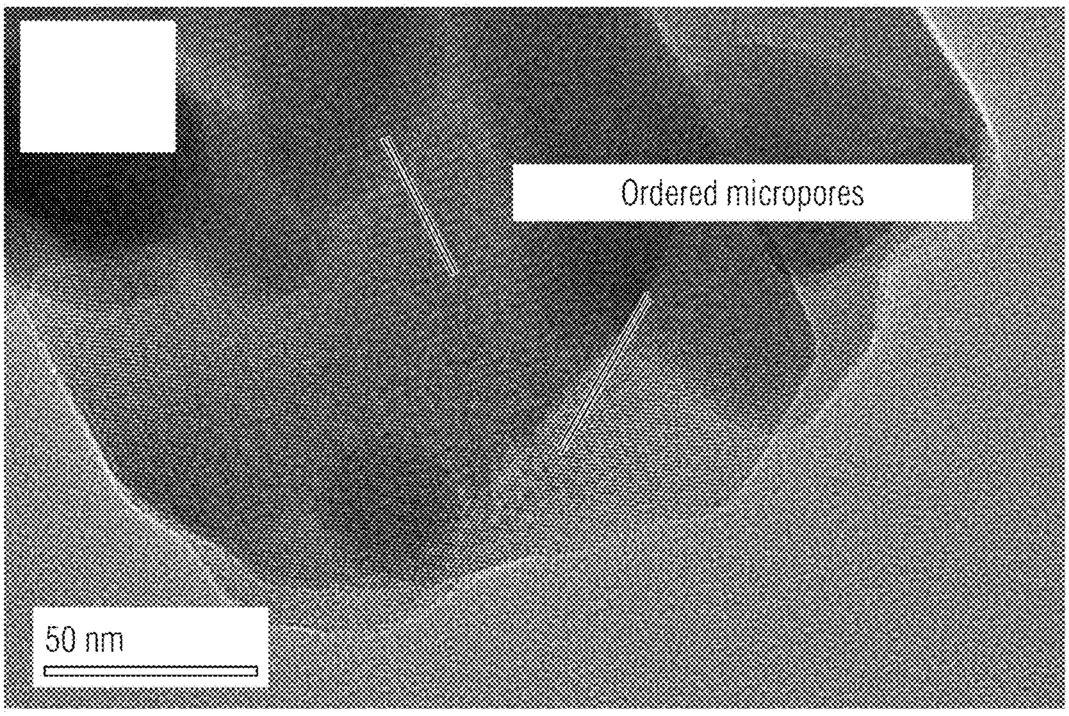
FIGS. 8(*a*), 8(*b*), 8(*c*), and 8(*d*) are Transmission Electron Microscope (TEM) images of cracking catalysts, according to one or more embodiments shown and described in the present disclosure.
Figure 8B:
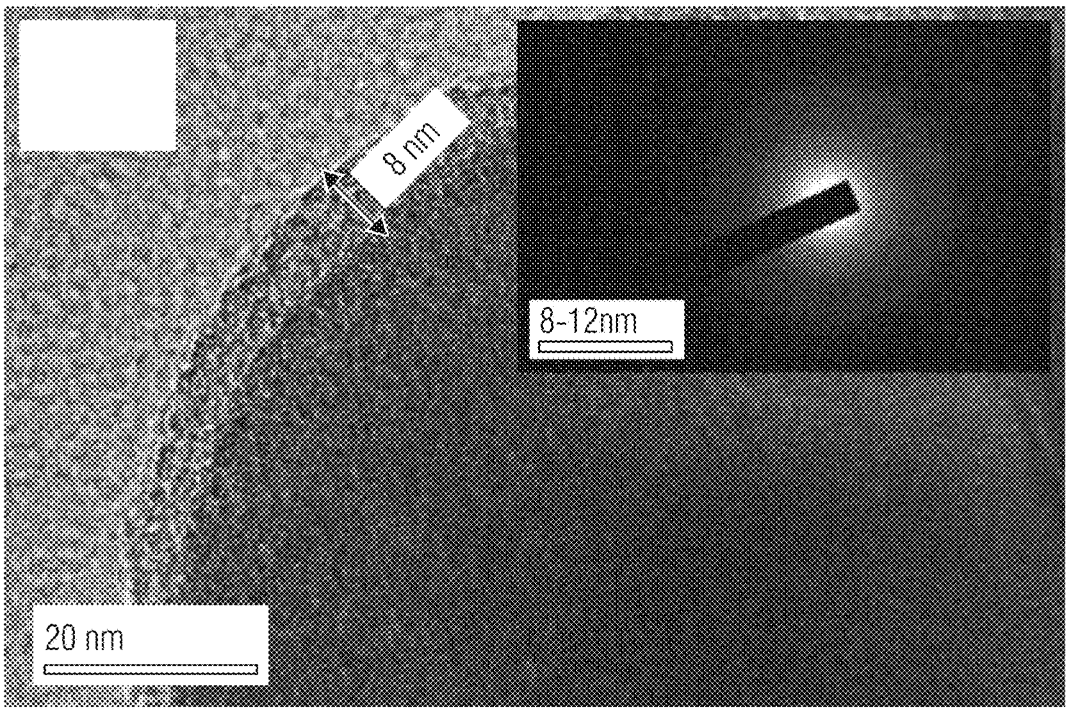
Figure 8C:
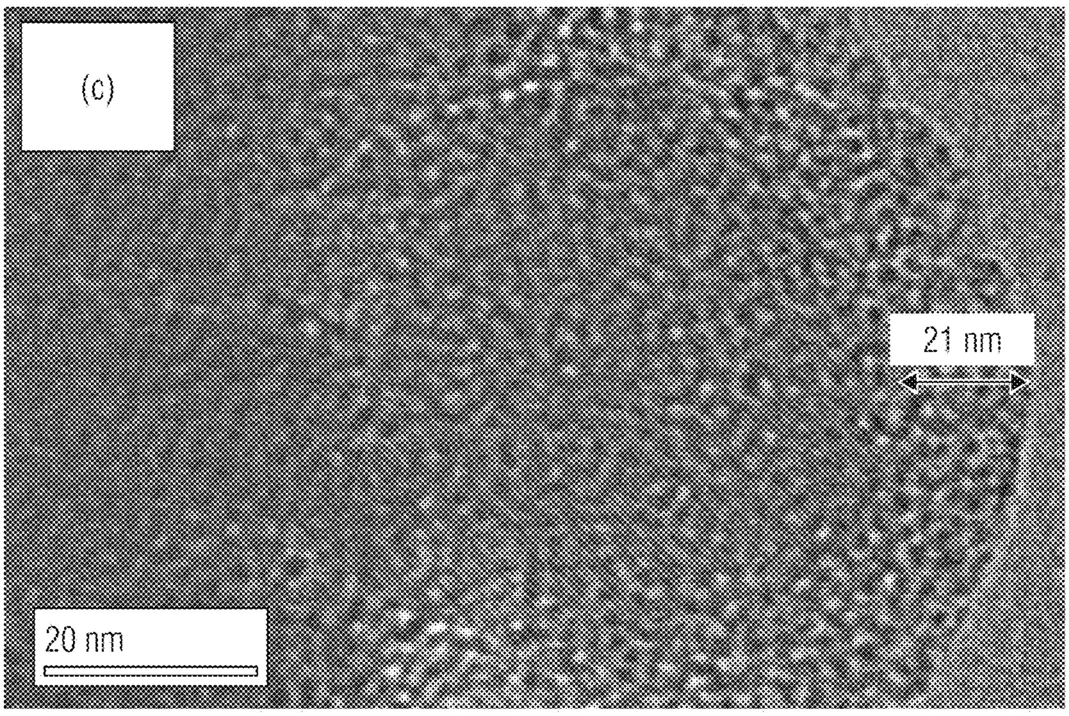
Figure 8D:
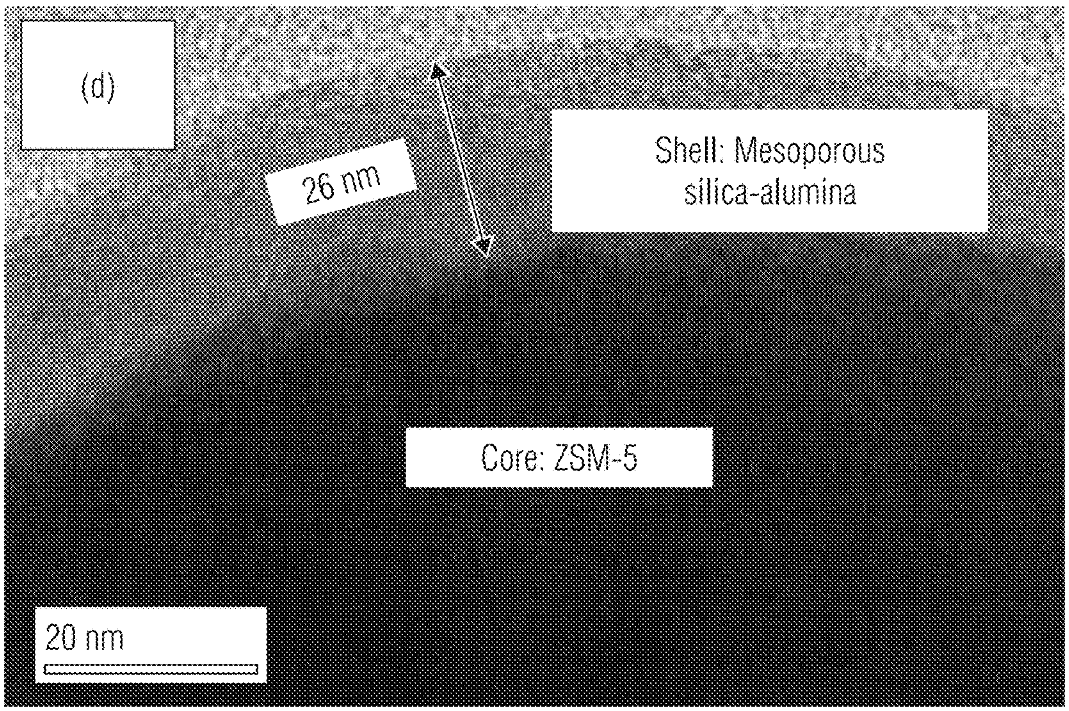

Field emission scanning electron microscope (FE-SEM) images were taken of a selection of the various comparative examples and cracking catalysts. FIG. 7(*a*) shows the ZSM-5 zeolite CE. A. FIG. 7(*b*) shows the cracking catalyst Ex. 1, and FIG. 7(*c*) shows the cracking catalyst Ex. 3.

As can be seen in the FIG. 7(*a*), the pristine ZSM-5 crystallites (CE. A) have a uniform sharp-edged, square morphology and a crystal size of about 150 nm. The core-shell composites Ex. 1 and Ex. 3, shown in FIG. 7(*b*) and FIG. 7(*c*) respectively, are slightly deformed from square to spherical and are well dispersed with varying shell thicknesses.

High resolution transmission electron microscopy (HRTEM) was performed on zeolite CE. A and cracking catalysts Ex. 1. Ex. 2, and Ex. 3. As can be seen in FIG. 8(*a*), which shows the zeolite CE. A, the zeolite possesses ordered micropores. As can be seen in FIG. 8(*b*), which shows cracking catalyst Ex. 1, a TEOS to silica ratio wt. ratio of 0.85 results in a shell thickness of about 8 nm. The inset of FIG. 8(*b*) is a selected area electron diffraction (SAED) plot, which shows that the mesoporous silica-alumina shell of cracking catalyst Ex. 1 did not have a ZSM-5 structure. As can be seen in FIG. 8(*c*), which shows cracking catalyst Ex. 2, a TEOS to silica wt. ratio of 1.28 results in a shell thickness of about 21 nm. As can be seen in FIG. 8(*d*), which shows cracking catalyst Ex. 3, a TEOS to silica wt. ratio of 1.7 results in a shell thickness of about 26 nm. Further, as can be seen in each of FIGS. 8(*b*), 8(*c*), and 8(*d*), the shell provides even coverage around the exterior of the zeolite core.

Catalyst Evaluation

The cracking catalysts were evaluated at atmospheric pressure in a steam fixed-bed reaction (FBR) system for the cracking of light crude oil. In particular, an Arabian Extra Light (AXL) crude oil as described in Table 2 was used. The cracked gaseous and liquid products were characterized by off-line gas chromatographic (GC) analysis using simulated distillation and naphtha analysis techniques.

Figure 9:
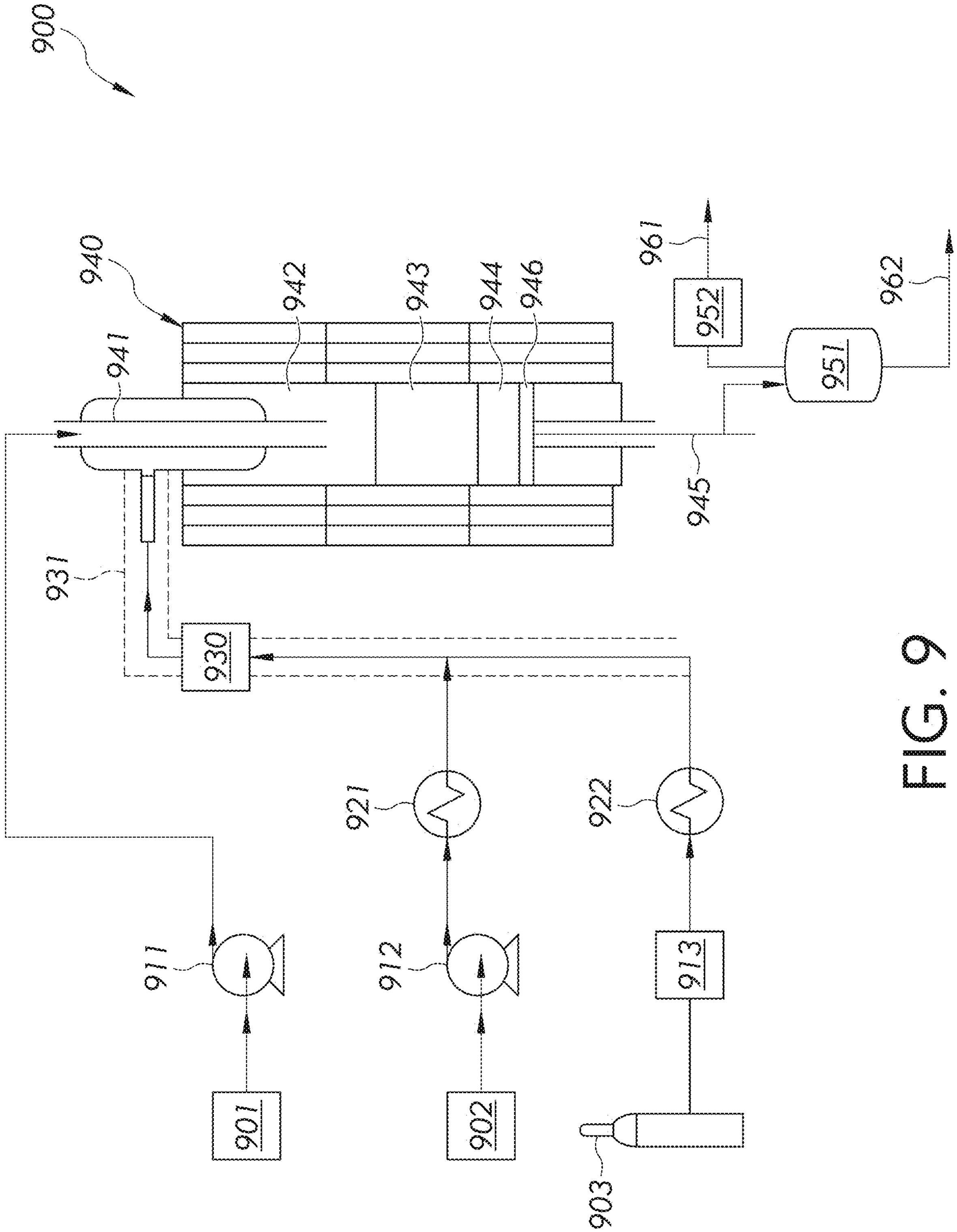
FIG. 9 schematically depicts a generalized flow diagram of a fixed bed reactor system for evaluating the cracking catalyst compositions of the examples, according to one or more embodiments shown and described in the present disclosure.

Referring now to FIG. 9, the FBR system (900) for conducting the catalyst evaluation experiments is schematically depicted. AXL crude oil (901) was fed to a fixed-bed reactor (940) using a metering pump (911). A constant feed rate of 2 g/h of the AXL crude oil (901) was used. Water (902) was fed to the fixed bed reactor (940) using a metering pump (912). Water (902) was preheated using a preheater (921). A constant feed rate of 1 g/h of water (902) was used. Nitrogen (903) was used as a carrier gas at 65 mL/min. Nitrogen (903) was fed to the fixed bed reactor (940) using a Mass Flow Controller (MFC) 913. Nitrogen (903) was preheated using a preheater (922). Water (902) and Nitrogen (903) were mixed using a mixer ((930)) and the mixture was introduced to the fixed-bed reactor (940). Prior to entering the reactor tube, the AXL crude oil (901), water (902), and nitrogen (903) were preheated up to 250° C. in the preheating zone (942). The pre-heating zone (942) was preheated using line heaters (931). Crude oil 301 was introduced from the top of the reactor (940) through the injector (941) and mixed with steam in the top two-third of the reactor tube (940) before reaching the catalyst bed (944).

The catalyst bed (944) in the reactor tube (940) was moved a few centimeters down to allow more time for pre-heating of AXL crude oil (901) prior to contacting with the cracking catalyst in the catalyst bed (944). For each experiment, 1 gram (g) of cracking catalyst having a mesh size of 30-40 was combine with 1 g of Kaolin clay and placed at the center of the reactor tube (940), supported by quartz wool (943), (946) and a reactor insert (945). Quartz wool (943), (946) was placed both at the bottom and top of the catalyst bed (944) to keep it in position. The height of the catalyst bed (944) was 1-2 cm. The cracking catalysts of Examples 6-8 and the comparative cracking catalyst of CE-C were each used as the cracking catalyst for a different experiment to conduct Catalyst Evaluation. Prior to conducting the steam catalytic cracking reaction, each of the cracking catalysts of Examples 6-8 and the commercial cracking catalysts of CE-C were steam deactivated in the presence of steam at a temperature of 810° C. for 6 hours.

Following steam deactivation, the crude oil hydrocarbon feed and the water/steam were introduced to the reaction tube of the FBR. The reaction was allowed to take place for 45-60 min, until steady state was reached. The mass ratio of steam to crude oil was 0.5 grams of steam per gram of crude oil. The crude oil was cracked at a cracking temperature of 675° C. and a weight ratio of catalyst to crude oil of 1:2. The residence time of the crude oil and the steam in the fixed bed reactor (940) was 10 seconds. The total time on stream for each individual experiment of was 5 hours.

The cracking reaction product stream (945) was introduced to a gas-liquid separator (951). A Wet Test Meter (952) was placed downstream of the gas-liquid separator (951). The cracked gaseous products (961) and liquid products (962) were characterized by off-line gas chromatographic (GC) analysis using simulated distillation and naphtha analysis techniques. The reaction product streams from the cracking reaction were analyzed for yields of ethylene, propylene, and butylene. Table 8 presents the results of the AXL cracking over kaolin blended with 50% of each of zeolite CE. C, and cracking catalyst EX. 6, EX. 7, and EX. 8. Table 8 shows that conversion and olefin selectivity over each of the cracking catalysts EX. 6, EX. 7, and EX. 8 is greater than over zeolite CE. A. Cracking catalyst Examples 6, 7, and 8 also produced less coke than the zeolite CE. C.

TABLE 8

| | AXL Feed | CE. C | CE. F | EX. 6 | EX. 7 | EX. 8 |
|---|---|---|---|---|---|---|
| fuel gas | 0 | 8.9 | 7.2 | 8.6 | 9.1 | 8.6 |
| sat $c_2$-$c_4$ | 0 | 4.3 | 4.7 | 5.3 | 5.4 | 4.7 |
| $c_2$ | 0 | 18 | 15.5 | 19.2 | 16.8 | 17.2 |
| $C_3$ | 0 | 14.5 | 15 | 18.5 | 14.8 | 15 |
| $C_4$ | 0 | 6.9 | 6.8 | 7.6 | 11.7 | 12 |
| naphtha | 40.8 | 31.1 | 26.5 | 21.6 | 25.7 | 27.5 |
| middle | 26.3 | 6.4 | 12.3 | 9.1 | 7.1 | 6.8 |
| heavy | 32.9 | 3.6 | 5.7 | 5.2 | 2.4 | 2.3 |
| coke | N/A | 6.2 | 6.3 | 4.7 | 7 | 5.8 |
| total olefins | 0 | 39.4 | 37.3 | 45.3 | 43.3 | 44.2 |
| $c_2$/total olefin | N/A | 0.456853 | 0.41555 | 0.423841 | 0.387991 | 0.38914 |
| $C_3$/total olefin | N/A | 0.36802 | 0.402145 | 0.408389 | 0.341801 | 0.339367 |
| $C_4$/total olefin | N/A | 0.175127 | 0.182306 | 0.16777 | 0.270208 | 0.271493 |
| Conversion | N/A | 58.9 | 55.5 | 64.1 | 64.8 | 63.4 |

Table 9 below shows the effect of the silica and the alumina in the shell coating, using the same test methods as described above. In this case zeolite CE. A, comparative catalyst CE. B, and cracking catalyst EX. 1 were tested.

TABLE 9

| Catalyst | CE. A | CE. B | EX. 1 |
|---|---|---|---|
| Mass balance, % | 98.0 | 100.2 | 99.8 |
| Conversion, % | 56.9 | 65.8 | 70.8 |
| Product Yields, wt. % | | | |
| $H_2$ | 0.74 | 0.97 | 0.93 |
| $C_1$ | 8.2 | 9.6 | 8.5 |
| $C_2^=$ | 14.7 | 21.4 | 22.0 |
| $C_2$ | 3.6 | 4.4 | 3.9 |
| $C_3$ | 0.4 | 0.9 | 1.2 |
| $C_3^=$ | 12.4 | 17.4 | 21.1 |
| $C_4^=$ | 8.7 | 4.7 | 6.3 |
| $iC_4$ | 0.2 | 0.34 | 0.24 |
| $nC_4$ | 0.5 | 0.11 | 0.80 |
| Total gas | 49.3 | 59.8 | 65.0 |
| Naphtha | 20.8 | 20.9 | 20.5 |
| LCO | 12.4 | 9.4 | 6.6 |
| HCO | 9.8 | 3.9 | 2.1 |
| Coke | 7.6 | 6.0 | 5.8 |
| $C_2^= + C_3^=$ | 27.1 | 38.8 | 43.1 |
| $H_2$—$C_2$ (dry gas) | 27.2 | 36.4 | 35.4 |
| $C_2^=$—$C_4^=$ | 35.8 | 43.5 | 49.4 |
| $C_3$—$C_4$ (LPG) | 22.1 | 23.4 | 29.6 |
| $C_3^=/C_2^=$ | 0.8 | 0.8 | 1.0 |
| $C_1$—$C_4$ | 12.8 | 15.3 | 14.7 |
| LPG olefins | 21.1 | 22.0 | 27.4 |
| LPG olefinicity | 95.3 | 94.3 | 92.4 |

As can be seen in Table 9, the inclusion of the silica-alumina shell in cracking catalyst EX. 1 resulted in greater conversion relative to both the silica shell of comparative catalyst CE. B and the zeolite of CE. A. Cracking catalyst EX. 1 also produced more $C_2$ and $C_3$ olefins than zeolite CE. A and comparative catalyst CE. B.

Table 10 below shows the effect of silica to alumina ratio (SAR), shell thickness, and Al content on the steam catalytic cracking of AXL crude oil using various catalysts of the present disclosure. The TEOS/Zeolite (wt. ratio) is used as a proxy for shell thickness.

TABLE 10

| | ZSM-5 SAR[a] | | | Shell thickness and Al content | |
|---|---|---|---|---|---|
| Catalyst | EX. 6 | EX. 1 | EX. 9 | EX. 2 | EX. 4 |
| SAR | 80 | 30 | 23 | 30 | 30 |
| TEOS/Zeolite (wt. ratio) | 0.85 | 0.85 | 0.85 | 1.28 | 0.85 |

TABLE 10-continued

| | ZSM-5 SAR[a] | | | Shell thickness and Al content | |
|---|---|---|---|---|---|
| Catalyst | EX. 6 | EX. 1 | EX. 9 | EX. 2 | EX. 4 |
| TEOS/ $Al_2(SO_4)_3$•$18H_2O$ molar ratio | 15.86 | 15.86 | 15.86 | 15.86 | 10.25 |
| Mass balance, % | 100.2 | 99.8 | 100.4 | 100.7 | 100.1 |
| Conversion, % | 64.0 | 70.8 | 62.7 | 67.4 | 63.3 |
| Product Yields, wt. % | | | | | |
| $H_2$ | 0.76 | 0.93 | 0.93 | 0.90 | 0.91 |
| $C_1$ | 7.8 | 8.5 | 7.9 | 8.2 | 8.7 |
| $C_2^=$ | 19.2 | 22.0 | 18.7 | 20.7 | 20.2 |
| $C_2$ | 3.9 | 3.9 | 4.1 | 3.8 | 4.4 |
| $C_3$ | 0.9 | 1.2 | 1.2 | 0.9 | 1.0 |
| $C_3^=$ | 18.5 | 21.1 | 16.1 | 19.3 | 17.5 |
| $C_4^=$ | 7.6 | 6.3 | 5.8 | 7.0 | 4.2 |
| i-$C_4$ | 0.12 | 0.24 | 0.13 | 0.15 | 0.17 |
| n-$C_4$ | 0.42 | 0.80 | 0.42 | 0.16 | 0.11 |
| Total gas | 59.3 | 65.0 | 55.4 | 61.1 | 57.2 |
| Naphtha | 21.6 | 20.5 | 25.5 | 22.7 | 22.4 |
| LCO | 9.1 | 6.6 | 8.0 | 6.6 | 9.8 |
| HCO | 5.2 | 2.1 | 3.8 | 3.3 | 4.4 |
| Coke | 4.7 | 5.8 | 7.3 | 6.3 | 6.1 |
| $C_2^= + C_3^=$ | 37.7 | 43.1 | 34.8 | 40.0 | 37.7 |
| $H_2$—$C_2$ (dry gas) | 31.7 | 35.4 | 31.7 | 33.6 | 34.3 |
| $C_2^=$—$C_4^=$ | 45.3 | 49.4 | 40.6 | 47.0 | 41.9 |
| $C_3$—$C_4$ (LPG) | 27.6 | 29.6 | 23.7 | 27.5 | 23.0 |
| $C_3^=/C_2^=$ | 1.0 | 1.0 | 0.9 | 0.9 | 0.9 |
| $C_1$—$C_4$ | 13.2 | 14.7 | 13.8 | 13.2 | 14.4 |
| LPG olefins | 26.1 | 27.4 | 21.9 | 26.3 | 21.7 |
| LPG olefinicity | 94.7 | 92.4 | 92.4 | 95.6 | 94.6 |

As can be seen in Table 10, increasing shell thickness from a TEOS/Zeolite (wt. ratio) of 0.85 to 1.28 led to decreased conversion and decreased production of light olefins. Additionally, decreasing acidity from a TEOS/$Al_2(SO_4)_3$·$18H_2O$ molar ratio of 15.86 to 10.25 led to decreased conversion and decreased production of light olefins.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for converting a hydrocarbon feed, the process comprising contacting a hydrocarbon feed with steam in the presence of a cracking catalyst under steam enhanced catalytic cracking conditions, where:

the cracking catalyst comprises a nanoparticle, wherein the nanoparticle comprises:

a core comprising at least one zeolite particle, where the at least one zeolite particle comprises ZSM-5 zeolites, Beta zeolites, Y-zeolites, or combinations of these zeolites; and a shell that is mesoporous and comprises silica ($SiO_2$), alumina ($Al_2O_3$), or silica and alumina, where the shell comprises less than 5 wt. % of a zeolitic phase; and the contacting the hydrocarbon feed with the steam in the presence of the cracking catalyst causes at least a portion of the hydrocarbon feed to undergo steam catalytic cracking reactions to produce a cracked effluent comprising $C_2$ to $C_4$ olefins, $C_6$ to $C_{10}$ aromatic compounds, or both.

2. The process of claim 1 where the at least one zeolite particle comprises a Beta zeolite, a Y-zeolite, or Beta zeolite and Y-zeolite.

3. The process of claim 1, where the at least one zeolite particle has an average particle size of from 200 nm to 300 nm.

4. The process of claim 1, where the at least one zeolite particle has a molar ratio of silica to alumina of from 23 to 500.

5. The process of claim 1, where the at least one zeolite particle has a molar ratio of silica to alumina of from 23 to 80.

6. The process of claim 1, where the core comprises a single zeolite particle.

7. The process of claim 1, where the shell:

has a thickness of from 8 nm to 26 nm, comprises silica and alumina, has a molar ratio of silica to alumina of from 10 to 50, and has an average pore diameter of from 2 nm to 50 nm.

8. The process of claim 1, where the cracking catalyst has a mesoporous pore volume of at least 0.020 $cm^3/g$.

9. The process of claim 1, where the cracking catalyst has a volume ratio of mesopores to micropores of at least 0.6.

10. The process of claim 1, where the cracking catalyst has a mesoporous surface area of at least 175 m2/g.

11. The process of claim 1, where the cracking catalyst comprises less than 0.1 wt. % of metals other than silicon and aluminum, based on the total weight of the cracking catalyst.

12. The process of claim 1, where the contacting further comprises contacting the hydrocarbon feed with the steam in the presence of the cracking catalyst at a weighted average bed temperature (WABT) of from 100° C. to 700° C., a steam to hydrocarbon feed mass ratio of from 0.2 to 0.8, or both.

13. The process of claim 1, where the hydrocarbon feed is a whole crude with an API gravity of from 25 to 52 and a sulfur content of from 0.05 wt. % to 3 wt. %, based on the total weight of the hydrocarbon feed.

14. The process of claim 1, wherein the contacting the hydrocarbon feed with the steam and the cracking catalyst under steam enhanced catalytic cracking conditions causes less than 6 wt. % of the hydrocarbon feed to be converted to coke, based on the total weight of the hydrocarbon feed.

15. The process of claim 1, where the cracked effluent comprises at least 40 wt. % of $C_2$ to $C_4$ olefins, based on the total weight of the hydrocarbons in the cracked effluent.

16. The process of claim 1, at least 20 wt. % of $C_2$ to $C_4$ olefins in the cracked effluent are butenes, based on the total weight of light olefins in the cracked effluent.

17. The process of claim 1, where the cracked effluent comprises at least 22 wt. % of naphtha, based on the total weight of hydrocarbons in the cracked effluent.

18. The process of claim 1, where:

the core has an average pore size of from 1 angstrom to 20 angstroms, the at least one zeolite particle is selected from Beta zeolites and Y-zeolites, the at least one zeolite particle has a molar ratio of silica to alumina of from 23 to 80, the shell has a thickness of from 8 nm to 26 nm, the shell comprises silica and alumina and has a molar ratio of silica to alumina of from 10 to 50, the shell has an average pore diameter of from 2 nm to 50 nm, the cracking catalyst has a mesoporous pore volume of at least 0.020 $cm^3/g$, the cracking catalyst has a volume ratio of mesopores to micropores of at least 0.6, the cracking catalyst has a mesoporous surface area of at least 175 $m^2/g$, the cracking catalyst has an average diameter of from 216 nm to 360 nm, the cracking catalyst comprises less than 0.1 wt. % of metals other than silicon and aluminum, based on the total weight of the cracking catalyst, the hydrocarbon feed is a whole crude with an API gravity of from 25 to 52 and a sulfur content of from 0.05 wt. % to 3 wt. %, based on the total weight of the hydrocarbon feed, the contacting further comprises contacting the hydrocarbon feed with the steam in the presence of the cracking catalyst at a weighted average bed temperature (WABT) of from 100° C. to 700° C., a steam to hydrocarbon feed mass ratio of from 0.2 to 0.8, or both, the cracked effluent comprises at least 40 wt. % of $C_2$ to $C_4$ olefins, based on the total weight of the hydrocarbons in the cracked effluent, the cracked effluent comprises at least 8 wt. % of butenes, based on the total weight of hydrocarbons in the cracked effluent, and at least 20 wt. % of $C_2$ to $C_4$ olefins in the cracked effluent are butenes, based on the total weight of light olefins in the cracked effluent.

19. The process of claim 1, where the core consists of silica and alumina.

* * * * *